(12) United States Patent
Chan et al.

(10) Patent No.: US 6,504,634 B1
(45) Date of Patent: Jan. 7, 2003

(54) SYSTEM AND METHOD FOR IMPROVED POINTING ACCURACY

(75) Inventors: Victor J. Chan, San Diego, CA (US); Scott H. Bloom, Encinitas, CA (US)

(73) Assignee: Air Fiber, Inc., San Diego, CA (US)

( * ) Notice: Subject to any disclaimer, the term of this patent is extended or adjusted under 35 U.S.C. 154(b) by 0 days.

(21) Appl. No.: 09/181,044

(22) Filed: Oct. 27, 1998

(51) Int. Cl.⁷ .............................................. H04B 10/10
(52) U.S. Cl. ...................... 359/159; 359/161; 359/110; 359/135; 359/143
(58) Field of Search .................. 359/159, 161, 359/110, 143, 135

(56) References Cited

U.S. PATENT DOCUMENTS

| | | | | |
|---|---|---|---|---|
| 3,566,126 A | * | 2/1971 | Lang et al. ................. | 250/199 |
| 5,060,304 A | | 10/1991 | Solinsky ..................... | 359/152 |
| 5,229,593 A | | 7/1993 | Cato | |
| 5,247,381 A | * | 9/1993 | Olmstead et al. ........... | 359/118 |
| 5,264,955 A | * | 11/1993 | Sakanaka et al. ........... | 359/152 |
| 5,451,765 A | | 9/1995 | Gerber | |
| 5,475,520 A | * | 12/1995 | Wissinger ................... | 359/172 |
| 5,532,858 A | | 7/1996 | Hirohashi et al. .......... | 359/159 |
| 5,546,445 A | | 8/1996 | Dennison et al. | |
| 5,592,320 A | | 1/1997 | Wissinger ................... | 359/159 |
| 5,710,652 A | * | 1/1998 | Bloom et al. ................ | 359/152 |
| 5,822,099 A | * | 10/1998 | Takamatsu ................... | 359/153 |
| 5,837,996 A | | 11/1998 | Keydar | |
| 6,049,593 A | | 4/2000 | Acampora | |
| 6,195,044 B1 | * | 2/2001 | Fowell ........................ | 342/367 |

FOREIGN PATENT DOCUMENTS

| | | |
|---|---|---|
| EP | 0 756 431 A2 * | 1/1997 |
| WO | WO 97/49204 | 12/1997 |
| WO | WO 98/20631 | 5/1998 |

* cited by examiner

Primary Examiner—Leslie Pascal
(74) Attorney, Agent, or Firm—Knobbe Martens Olson & Bear LLP

(57) ABSTRACT

A system and method for controlling the power of a transmitter helps to ensure that the transmitted signal is within the dynamic range of the intended receiver. The transmitted signal is received by the receiver. The received signal strength is measured to determine its power level in relation to the dynamic range of the receiver. Where the signal strength is too high, the transmitter is slewed to effectively decrease its pointing accuracy, thereby causing a lower-power portion of the transmitted signal to impinge upon the receiver. Similarly, where the signal strength falls below a desired level, the transmitter is slewed back toward the center-pointing position, effectively increasing its pointing accuracy, and thereby increasing the signal strength received at the receiver.

26 Claims, 24 Drawing Sheets

SYSTEM AND METHOD FOR IMPROVED POINTING ACCURACY

RELATED APPLICATIONS

The present application is related to co-pending U.S. Patent Applications No. To Be Assigned, titled "System and Method for Integrating a Network Node," No. To Be Assigned, titled "Wireless Communication Network," each of which are of common assignee and are filed concurrently herewith. The present application is also related to U.S. patent application Ser. No. 09/035,373, filed Mar. 5, 1998, titled "High Bandwidth Communication Systems for Large Buildings," and application Ser. No. 09/035,370, filed Mar. 5, 1998, titled Hybrid Picocell Communication System." Each of these co-pending applications are incorporated herein by reference in their entirety.

BACKGROUND OF THE INVENTION

1. Field of the Invention

The present invention relates generally to communication systems, and more particularly to a system and method for improving the pointing accuracy of a transmitter in a communication channel.

2. Related Art

Over the last several years there has been tremendous growth in the deployment of fiber-optic facilities by telecommunications carriers such as Regional Bell Operating Companies (RBOCs), cable carriers, and Competitive Local Exchange Carriers (CLECs). Deployment of these facilities along with the introduction of technologies such as OC-192 and DWDM has dramatically lowered the marginal cost of bandwidth on the fiber.

Thus, as a result of this development, there is extensive bandwidth and communications capability in carriers' backbone networks. However, many homes and offices do not have a practical solution to interface to these backbone networks. Consequently, direct attachment of potential customers to these backbone networks remains very expensive.

Currently, there are two practical methods for directly attaching customers to backbone networks such as optical fiber networks. These are buried or aerial fiber interconnections and microwave connections. However, both of these methods incur significant up-front costs before any revenue can be realized. In the case of buried or aerial fiber, these costs are associated with obtaining rights-of-way for the cable runs, and installing the cable by burying or hanging. In the case of a microwave system, these up front costs come not only from the cost associated with the microwave repeater equipment, but also from the costs associated with obtaining rights to the suitable portion of the spectrum. Therefore, system developers and integrators have sought long and hard to find suitable solutions to this "last mile" problem.

SUMMARY OF THE INVENTION

The present invention is directed toward a system and method for implementing a communication capability that allows one or more users at one or more user facilities to communicate with a communications network. For example, in one embodiment, the invention allows these users to communicate on one or more backbone networks supported by a common carrier or other service provider. According to one aspect of the invention, a multi-node communication network is provided that interfaces a plurality of buildings, houses, complexes, or other facilities to a service provider's backbone network. According to one realization, the nodes of the network can be provided with optical transceivers, so that the network links can be implemented as optical communication links. As such, the several buildings integrated by the network can be included in the network without the need to do cabling or otherwise physically connect the facilities. Additionally, the use of optical transceivers avoids the need to be concerned with wireless RF constraints such as bandwidth, interference, FCC approval and restrictions, and other concerns typically associated with RF communication.

According to another aspect of the invention, the nodes of the network can include transceivers that are fixed to a movable mount to facilitate pointing of a transceiver to another node in the network. For example, in one embodiment, an azimuth and elevation mount is provided that allows the transceiver to be pointed with a degree of accuracy to another transceiver in another node in the network.

In addition, one or more controllers can be provided with each node to control the pointing of transceivers and to provide other control features or functions useful in integrating a node within the network. Additionally, the controller can perform routing of data from the node to other nodes in the network and also any communication format changes that may be needed to interface in the network to the backbone network or to interface the network to a user within a facility.

According to another aspect of the invention, an installation fixture can be provided to facilitate the installation and alignment of one or more nodes within the network. Such an installation fixture is particularly useful in embodiments where pointing and alignment are somewhat critical. For example, where the communication links of the network are optical links, such links tend to use a relatively narrow beam width, and low power laser transmitters. As such, with these devices, pointing in alignment is critical to fall within the budgeted link margins.

According to one aspect of the invention, the installation fixture can include automated devices for determining the position of the node as well as the node orientation (e.g., in what direction a point on the fixture is pointing). For example, in one implementation, the installation fixture includes a GPS receiver to determine position information and a digital compass to determine the node orientation. Additionally, the digital compass can also be used to determine roll, pitch and yaw of the device relative to a fixed orientation. Thus, with the roll and pitch parameters, an indication of the level of the installation fixture can also be determined. Where the installation fixture is mounted to a node, determination of parameters for the fixture, results in a determination of these parameters for the node as well. Therefore, the installation fixture, when mounted to a node, can determine location, orientation, and leveling of a node in the network.

These parameters relating to the location and orientation of the node in the network can be used to compute pointing angles to enable the node to communicate with other nodes in the network. In one embodiment, the installation fixture can simply be a data gathering device, which gathers node parameters such as position and orientation information. In this embodiment, the data gathering device provides these parameters to another processor to determine the appropriate pointing angles to allow the transceivers within the node to accurately point to other nodes in the network. This computation can be performed, for example, by a processor within the node, or by a processor or processor-based system at a central office. Alternatively, processing capability can be provided within the installation fixture to enable the installation fixture to determine the pointing angles necessary to interface the subject node with the other nodes in the network. Additionally, processing responsibilities can be shared among the various processors in the system.

In one embodiment, positional information in three dimensions is known for each node in a network. As such, a relatively straight-forward geometric calculation can be used to determine the pointing angles necessary to interface the subject node with other nodes in the network. This positional information can be in terms of x, y, z coordinates relative to the earth. For example, the positional information can be in terms of latitude, longitude, and altitude. Alternative positional coordinates can be used, relative to the earth or relative to another fixed position. Preferably, each node within the network utilizes the same coordinate reference such that pointing angles can be determined without the need to perform additional coordinate translation computations.

According to another aspect of the invention, fine tuning of the transceiver pointing can be performed. In one embodiment, a spatial detector receives a portion of the received data signal. The location at which the beam impinges upon the spatial detector provides an indication of the pointing accuracy. This information can be used to adjust the pointing of the transmitter, for example, to center the beam on the spatial detector. In one realization, to avoid erroneous detection of noise sources, the transmitted data signal is encoded such that it can be identified. In one example, the transmitted data signal is modulated onto a relatively low-frequency carrier. The detector performs its pointing analysis based only on the low-frequency signal. Other signals are ignored. Because most noise sources appear as DC signals, this technique effectively allows the spatial detector to discriminate among the various signals and select the appropriate one.

According to another aspect of the invention, a technique for controlling the effective power of the beam carrying the data signal is provided. Because a range of atmospheric and other conditions can lead to a large range in received power, it is conceivable that the received beam can be outside the dynamic range of the receiver. For example, where the transmitter is adjusted to provide adequate power in fog or other adverse weather conditions, the transmitter may be overpowered in ideal weather conditions. This can result in saturation of the detector.

Therefore, in one embodiment, the signal strength of the received signal is measured, and it is determined whether the power needs to be adjusted. If so, the transmitter is directed to adjust its pointing such that the effective power impinging on the remote detector is adjusted. For example, where the power exceeds a determined threshold level, the transmitter may be directed to look-off from the on-center pointing, to decrease the signal level of the beam impinging upon the remote detector. As such, the effective power is decreased to that which is within the dynamic range of the receiver. In one embodiment, this direction can be provided via a control channel on the link.

Further features and advantages of the invention as well as the structure and operation of various embodiments of the invention are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

The present invention is directed toward a system and method for providing enhanced features for a communication network. Specifically, according to one aspect of the invention, a novel communication network is provided. The communication network can be implemented to provide high quality, high-bandwidth communication services to the home, office, or other facility. Advantageously, the communication network can be implemented to provide an interface between the numerous and diverse communication equipment in various homes, offices or other facilities and copper or fiber backbone carrier networks.

Figure 1:
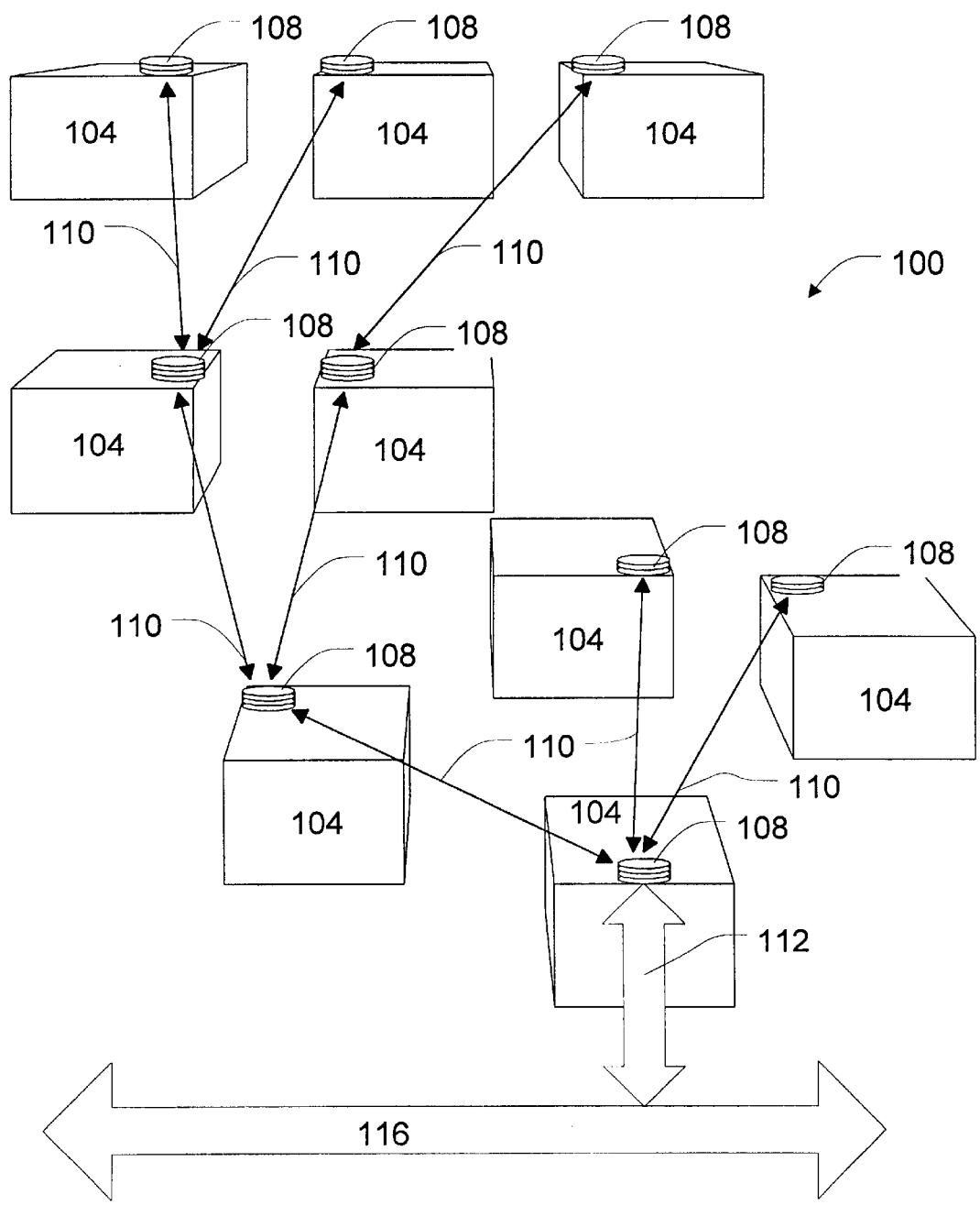
FIG. 1 is a diagram illustrating an example communication network according to one embodiment of the invention.

FIG. 1 is a diagram illustrating an example communication network 100 according to one embodiment of the invention. Referring now to FIG. 1, the example communication network 100 illustrated in FIG. 1 can include a plurality of nodes 108, interconnected by communication links 110. According to one embodiment of the invention, the network nodes 108 are disposed on facilities 104. Although only one node 108 is provided per facility in the example illustrated in FIG. 1, more than one node 108 can be provided at one or more of facilities 104, depending on the communication requirements, and also, perhaps, depending on the particular facility.

In one embodiment, facilities 104 can be buildings, towers, or other structures, premises, or locations. Advantageously, facilities 104 can, for example be homes or offices to which it is desirable to interface one or more backbone networks of one or more common carriers or service providers. In this example embodiment, network 100 can provide the interface between the facilities and the backbone network.

Preferably, according to one embodiment, nodes 108 are interconnected with one another by optical communication links 110. In this optical embodiment, nodes 108 can include one or more optical transmitters and receivers to provide the communication links 110 among the plurality of nodes 108. Nodes 108 can also be implemented such that communication links 110 are RF communication links. Although nodes 108 can be hardwired together, it is preferable that communication links 110 be wireless communication links to better facilitate interconnection of a variety of facilities.

The number of transmitters and receivers provided at a given node 108 can be varied depending on the fan-out capabilities desired at that node 108. However, in one embodiment, each node 108 has four transceivers, allowing each node 108 to connect its associated facility 104 with up to four additional nodes 108 at four additional facilities 104. The provision of both a receiver and transmitter (i.e., transceiver) for each fan out of the node 108 allows bi-directional communication among nodes 108.

In optical embodiments, transceivers at nodes 108 can be implemented using, for example, lasers or light emitting diodes (LEDs) as the optical transmitters and charge-coupled devices (CCDs), photomultiplier tubes (PMTs), photodiode detectors (PDDs) or other photodetectors as the receivers. Transmitter and receiver technologies for one or more preferred optical embodiments are discussed in detail below.

Although the network 100 illustrated in FIG. 1 is illustrated as a branching tree network structure, other network structures or geometries can be implemented.

According to one aspect of the invention, the network 100 can be implemented and utilized to directly connect a plurality of customers in one or more facilities 104 to a high-capacity communication network 116. For example, network 100 can be used to connect the plurality of customers to a copper or optical fiber backbone network. Advantageously, the network can therefore allow the customers to access a high data rate, high-bandwidth communication network from their home, office or other facility, regardless of the existing connection capabilities within that facility. Thus, network 100 can be implemented to avoid the need to cable a backbone network over the "last mile" to each facility 104.

To accomplish this objective, at least one of nodes 108 is designated as a root node 108A. Root node 108A includes additional functionality to interface the communication network 100 to a provider network 116 via another communication link 112. In one embodiment, provider network 116 can, for example, be a high bandwidth copper or fiber service provider or common-carrier network 116.

Figure 2:
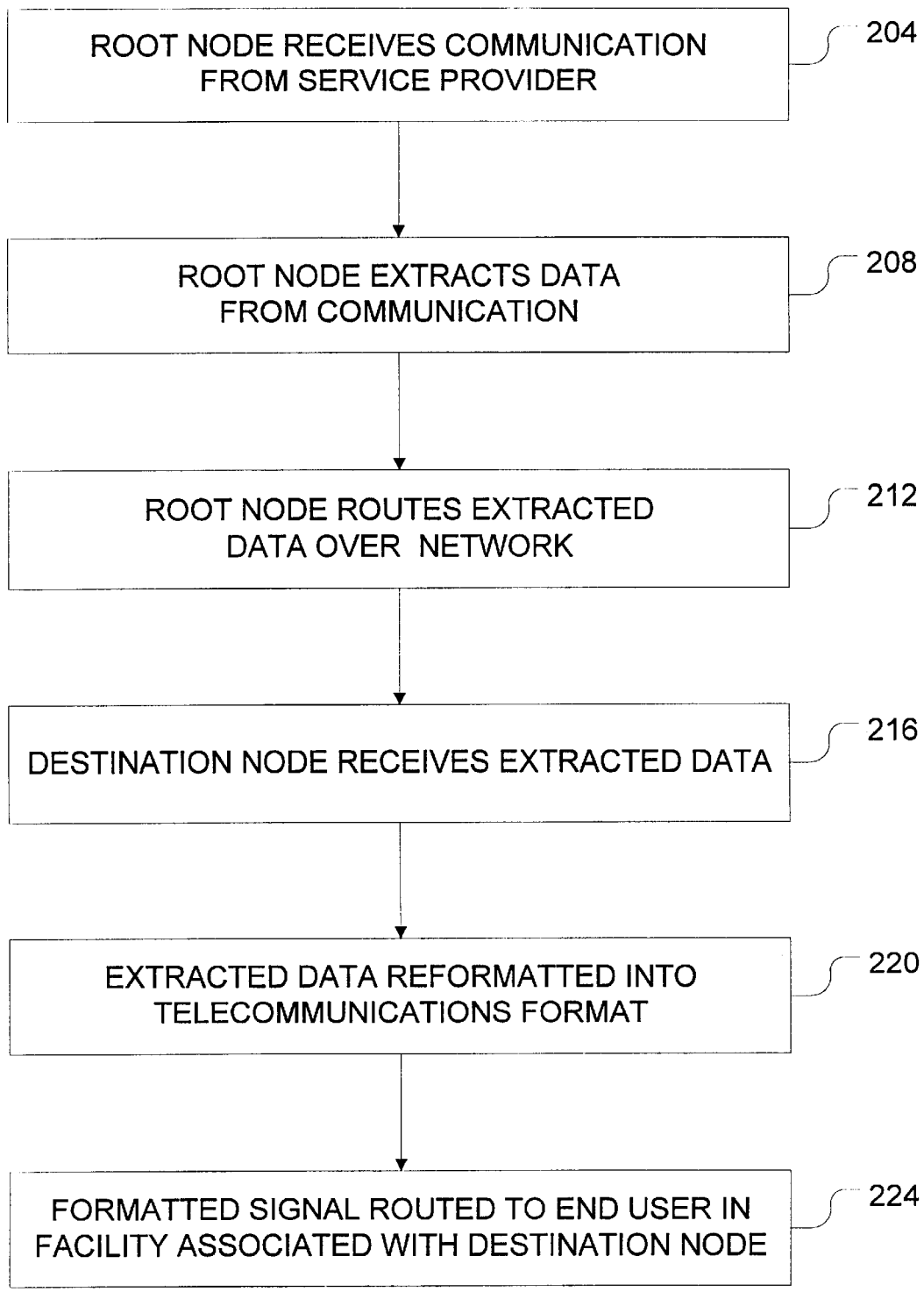
FIG. 2 is an operational flow diagram illustrating a process by which the communication network operates according to one embodiment of the invention.

FIG. 2 is an operational flow diagram illustrating a process by which the communication network operates according to one embodiment of the invention. In a step 204, a root node 108A of communication network 100 receives a communication from the provider network 116. In a step 208, root node 108A accepts the communication and, if necessary or desired, reformats the communication into a format that can be transported across the network of nodes 108 and communication links 110. For example, in an embodiment where network 100 is a packet-switched network, root node 108A formats the communication into packets suitable for transmission across the optical communication links 110.

Root node 108A may also determine routing information such that the data can be sent to the appropriate destination node 108, also referred to as a premise node 108. In embodiments using packet data, the routing information can be included in the packet header of the packets being sent across network 100. In alternative network geometries, a designation of the destination node 108 may be used in place of or in addition to routing information. For example, ring geometries use destination information as an address for the packets in place of routing information.

In a step 212, root node 108A routes the reformatted data across the network 100 to the designated destination node 108. The route may be directly to destination node 108 or via one or more intermediate nodes 108, which are referred to as junction nodes 108 in this capacity. In embodiments using packet data, for example, junction nodes 108 may use packet header information to route a received packet to the next node 108.

In a step 216, the destination node 108 receives the data. The received data is forwarded to the end user at the facility 104 associated with the destination node 108. This is illustrated by step 224. In a preferred embodiment, prior to forwarding the data to the end user, the data is reformatted. In one embodiment, the data is reformatted into a telecommunications format such as, for example, the original format that the data was in when it was received from provider network 116. This is illustrated by step 220.

In this embodiment, the fact that the user is interfaced to the provider network 116 via the network of links 110 and nodes 108 is preferably transparent to the user. Communications from the user to the provider network 116 can similarly take place, but in the reverse order. Thus, network 100 can provides a two-way connection between one or more users in one or more facilities 104 with provider network 116. Although only one provider network 116 is illustrated in FIG. 1, one or more root nodes 108A can be used to interface to more than one provider network 116 in alternative embodiments.

Thus, according to one aspect of the invention, a service provider can provide service to users in a plurality of facilities 104 by providing a signal to the root node 108A of the system. In one embodiment, nodes 108 use the Asynchronous Transfer Mode (ATM) as the data transport mechanism. Although nodes 108 can use other transport mechanisms, in this embodiment it is preferred that the service provider provide data to root node 108A as ATM cells. In this manner, node 108A does not have to perform a format translation. In alternative embodiments, format translation can be provided to allow flexibility.

Figure 3:
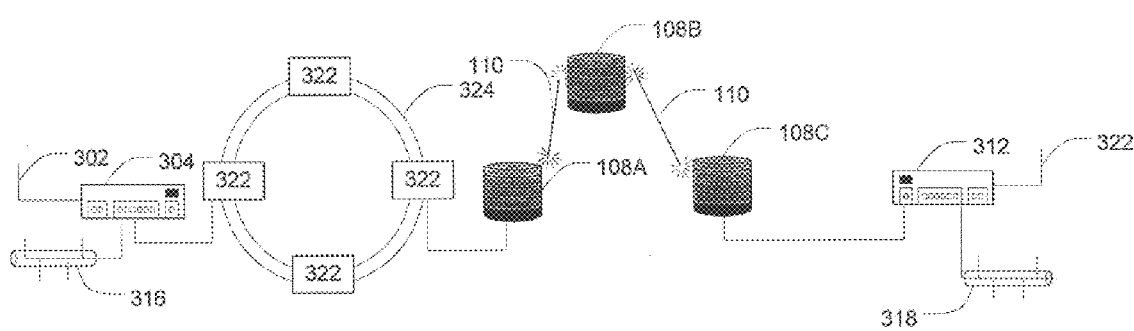
FIG. 3 is a block diagram illustrating an example embodiment where a service provider utilizes a SONET ring to interface to root node according to one embodiment of the invention.
Figure 4:
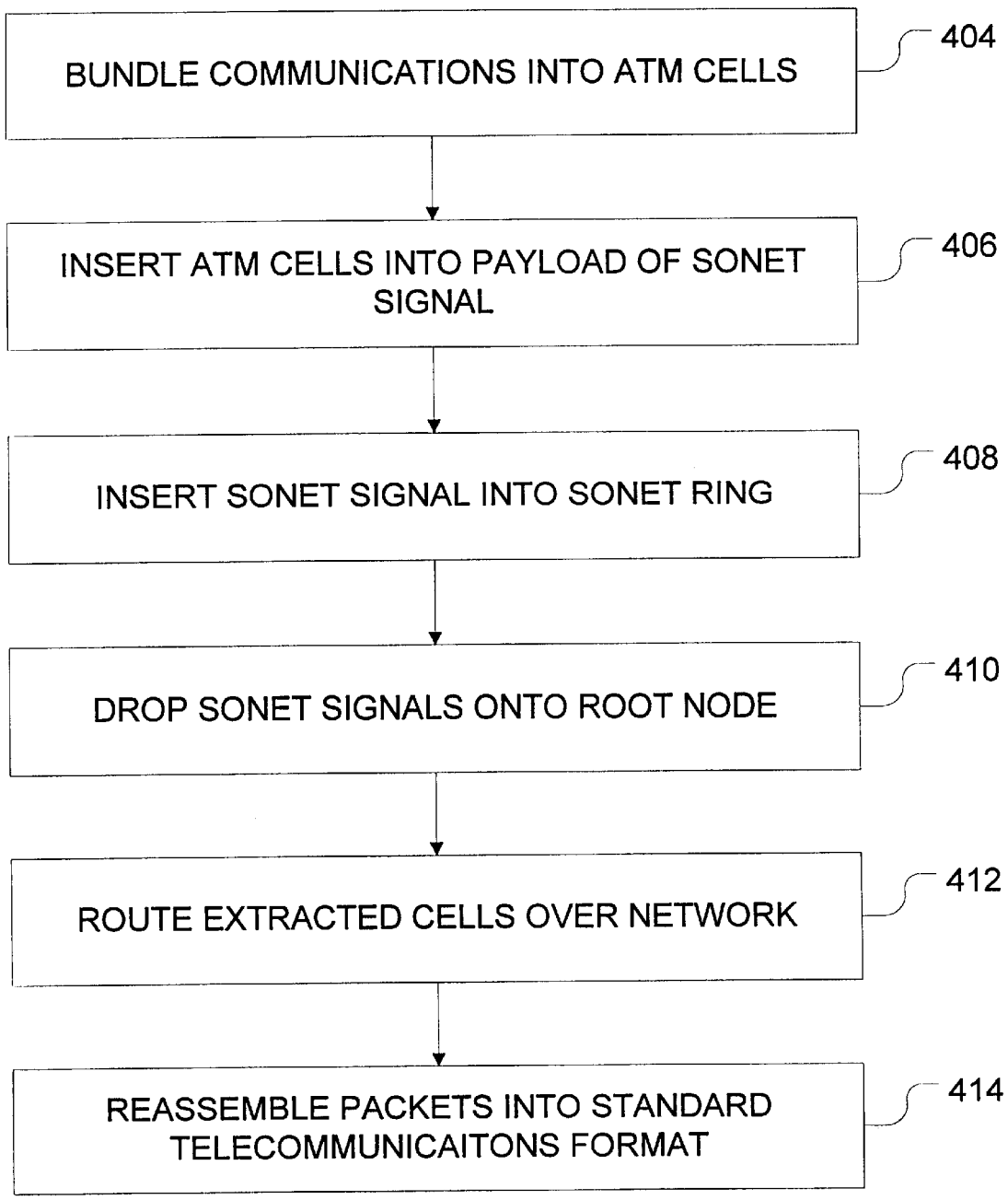
FIG. 4 is an operational flow diagram illustrating a method for utilizing the architecture illustrated in FIG. 3 to provide communications to an end user according to one embodiment of the invention.

To provide ATM cells, the service provider can provide a pre-atomized concatenated signal, such as, for example, a SONET signal to root node 108A via provider network 116. FIG. 3 is a block diagram illustrating an example embodiment where a service provider utilizes a SONET ring to interface to root node 108A. FIG. 4 is an operational flow diagram illustrating a method for utilizing the architecture illustrated in FIG. 3 to provide communications to an end user according to one embodiment of the invention.

Referring now to FIGS. 3 and 4, in the example embodiment, an ATM switch 304 is provided at the service provider facilities. In a step 404, the ATM switch 304 can be used to bundle communications from a variety of input sources such as, for example, T1 lines 302, Ethernet networks 316, and so on. The ATM switch 304 can bundle the communications from these sources into ATM cells.

In a step 406, the ATM cells can be inserted into the payload of a concatenated signal such as, for example, a SONET signal.

In a step 408, the SONET signal is provided to an Add/Drop Multiplexer (ADM) 322 for insertion into a high-speed SONET ring. In one embodiment, ATM switch 304 formats the received data into, for example, an OC-3c format. Thus, in this embodiment, ATM traffic can already be framed in STS-3c format prior to delivery to ADM 322 for entry to a SONET ring 324. In one embodiment, SONET ring 324 can be implemented as a high-speed ring, for example OC-192.

In a step 410, the ADM 322 closest to the root node 108A drops the OC3-C signal to the root node 108A. In one embodiment, root node 108A can accept up to four OC3-C signals from ADM 322, although this quantity is scalable. Root node 108A extracts the ATM cells, which are routed over the communication network 100 via one or more junction nodes 108B to the designated destination node 108C. This is illustrated by a step 412.

At the destination node 108C, the ATM packets are reassembled into a telecommunications format expected by the end user as illustrated in a step 414. In one embodiment, the communication is provided to demarcation equipment 312 and the demarcation equipment 312 reassembles the packets into a standard telecommunications format. For example, in one embodiment, an NTU 312 can be provided to reassemble the packets into a format such as SONET, STM, or ATM. The formatted telecommunications signal can be provided to the user's network 318 or other communication link 322.

Figure 5:
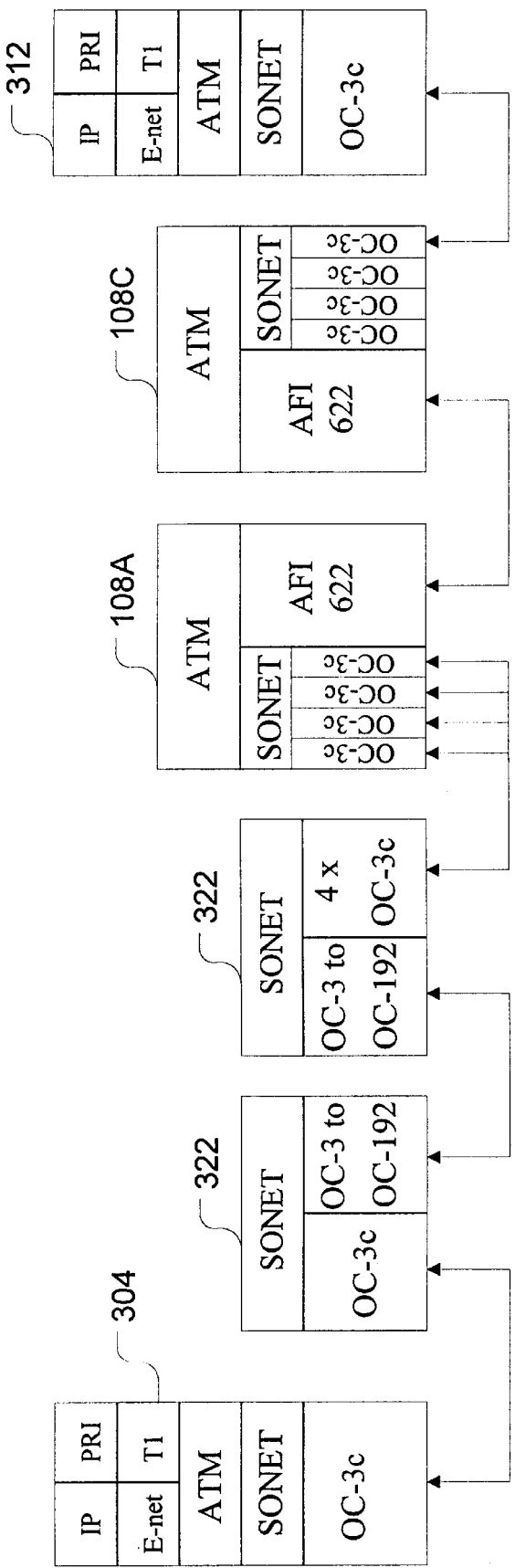
FIG. 5 is a diagram illustrating an example software protocol architecture for an ATM/SONET implementation such as that illustrated in FIG. 3.

FIG. 5 is a diagram illustrating an example software protocol architecture for an ATM/SONET implementation such as that illustrated in FIG. 3. Referring now to FIG. 4, at ATM switch 304, telecommunication signals such as, for example, Ethernet, T1, IP, PRI are bundled into ATM cells that are inserted into an OC-3c SONET signal. Where SONET network is a high-speed network such as, for example OC-192, ADMs 322 provide the transition from OC-3 to OC-192 at the ingress ADM 322 and back to OC-3c at the egress.

In the embodiment illustrated in FIG. 4, root node 108A is capable of receiving up to four OC-3c SONET signals. Root node 108A extracts the ATM cells from the SONET signal(s), and routes the ATM cells via one or more links 110 to the destination node. In one embodiment, communication links 110 are optical links operating at 622 Mbps, and can be switched in and out of nodes 108 using packet switches located in each node. An example architecture for nodes 108 is described in greater detail below. At the destination node 108C, the ATM cells are re-inserted into the SONET signal and the NTU 312 reassembles the packets into the user's desired telecommunications format(s).

In the example illustrated in FIG. 5, root node 108A is capable of receiving four signals simultaneously. This quantity conforms to a fan-out capability of four communication links 110 from root node 108A. That is, with a fan-out capability of four, root node 108A can simultaneously transmit data to four other nodes 108. Similarly, at destination node 108C, in one embodiment this node is capable of receiving up to four signals simultaneously from four other nodes 108. As stated above, these quantities are scalable.

Figure 6:
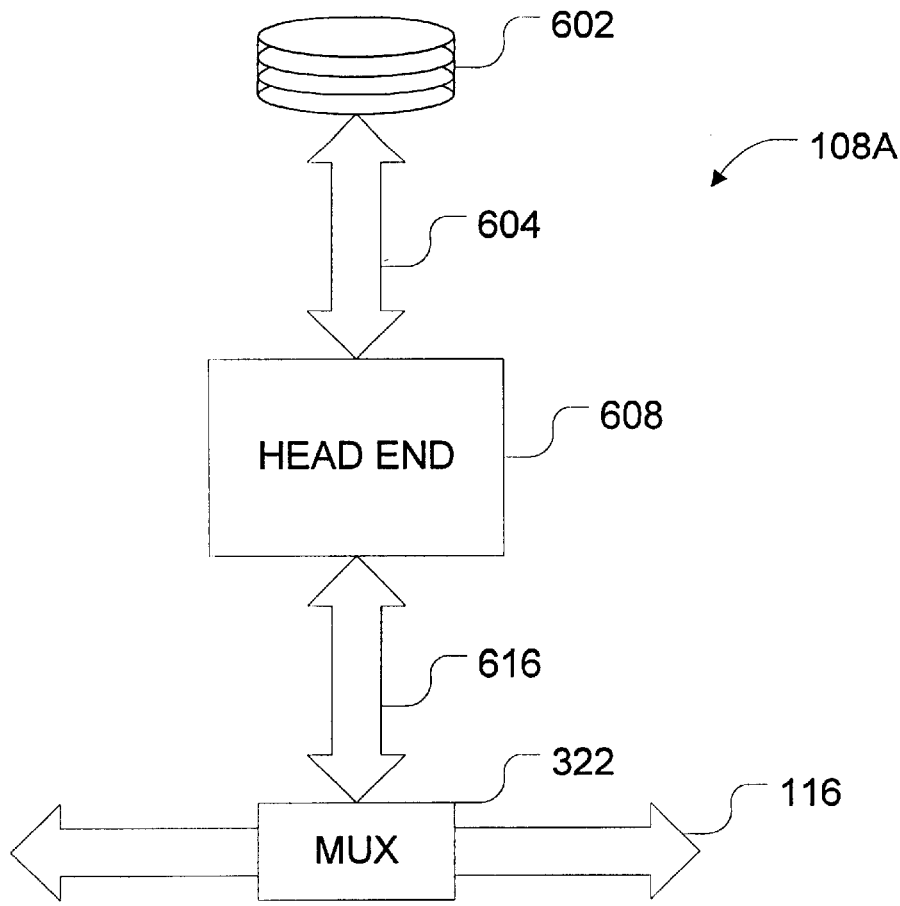
FIG. 6 is a diagram illustrating the functionality provided at a root node according to one embodiment of the invention.

FIG. 6 is a diagram illustrating the functionality provided at a root node 108A according to one embodiment of the invention. Specifically, the diagram of FIG. 6 illustrates an example implementation for interfacing a root node 108A to a network 116. In one specific example described above, root node 108A includes the OC-3c communication link 616 to an ADM 322 of the SONET ring 324. A head end 608 at root node 108A extracts the ATM packets 604 from the OC-3c signal(s) 616 and provides them to one or more transceivers 602. A transmitter portion of transceiver(s) 602 transmits the ATM packets across one or more communication links 110 to a destination node 108C.

Figure 7:
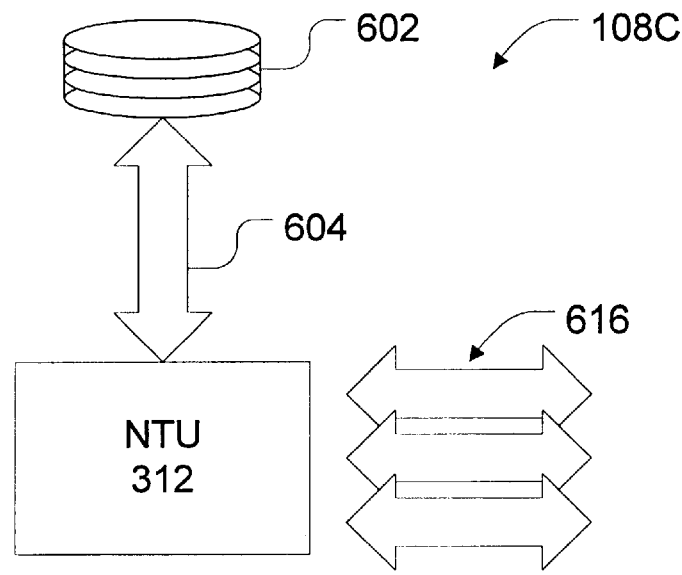
FIG. 7 is a diagram illustrating the functionality provided at a destination node for interfacing a node to user equipment at a facility according to one embodiment of the invention.

FIG. 7 is a diagram illustrating the functionality provided at a destination node 108C for interfacing a node 108 to user equipment at a facility 104 according to one embodiment of the invention. Referring now to FIG. 7, destination node 108C also includes one or more transceivers 602. A receiver portion of a transceiver 602 receives the ATM packets transmitted from a transmitter portion of root node 108A. The transmission may be via one or more intermediate nodes 108B. The ATM packets 604 are provided to the NTU at facility 104. NTU 624 can then provide the communication in the appropriate format or formats for the user or users in facility 104 as illustrated by flow lines 616.

The above description provided with reference to FIGS. 3–7 sets forth an example implementation of the communication network using specific protocols and data formats. After reading this description, it will become apparent to one of ordinary skill in the art that many other formats, configurations and combinations are possible, and that other architectures and configurations can be implemented to accommodate such formats and protocols.

Figure 8:
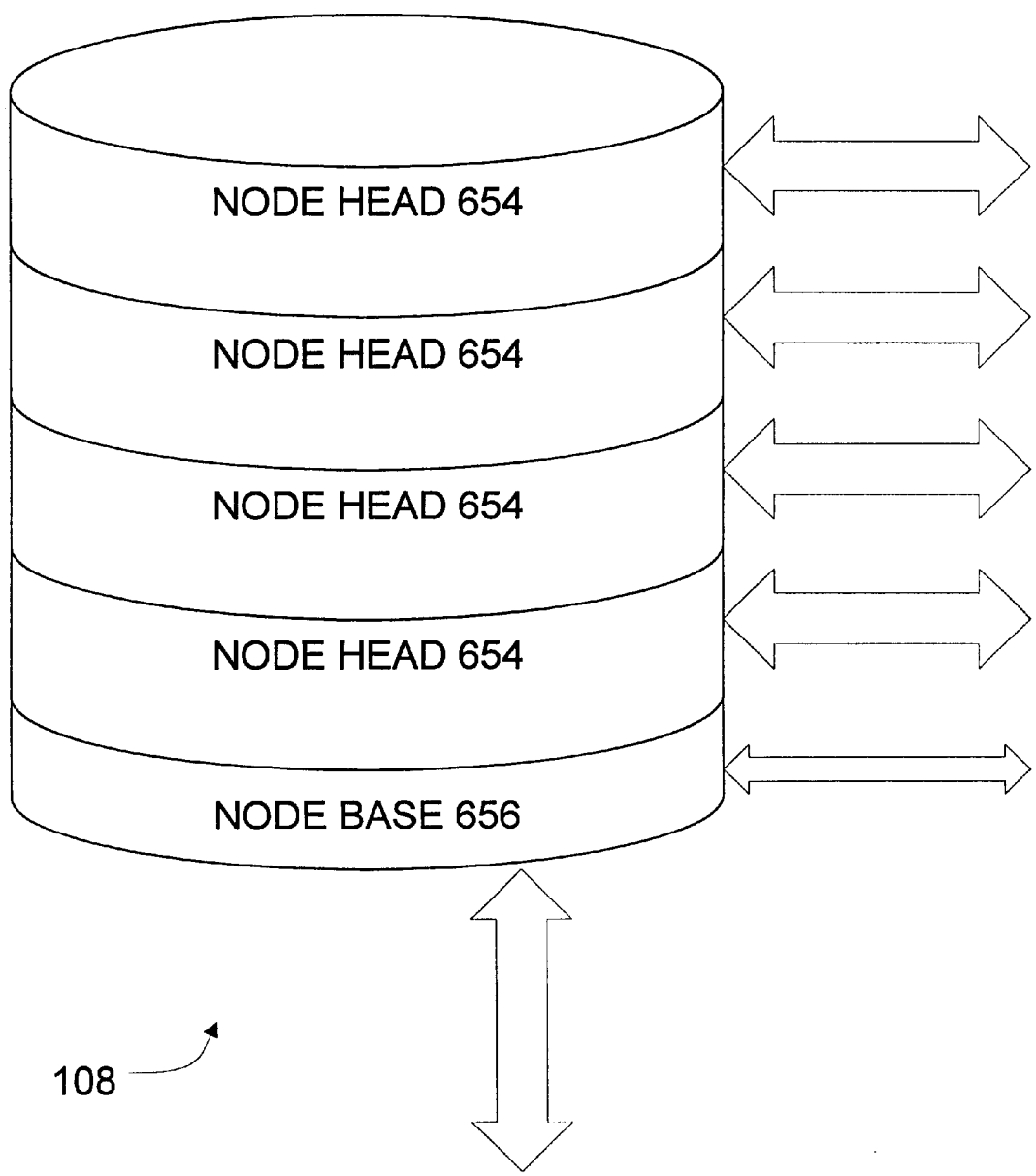
FIG. 8 is a diagram illustrating an example implementation of a node according to one embodiment of the invention.

Nodes 108 are now described in more detail according to one or more embodiments of the invention. FIG. 8 is a diagram illustrating an example implementation of a node 108 according to one embodiment of the invention. The example implementation of node 108 illustrated in FIG. 8 is generally cylindrical in shape and includes four node heads 654 and a node base 656. Node heads 654 can each include a transceiver to facilitate communication with one or more other nodes 108 in a network 100. In one embodiment, there is a single transceiver in each node head 654, and each node head 654 provides a communication link 110 with one other node 108 in the network 100 at a given time.

Preferably, each transceiver has both a receiver and a transmitter, providing two-way communications. However, in alternative embodiments, a node head 654 could have just a transmitter or just a receiver, thereby providing one-way communications. Additionally, it is possible for one or more node heads 654 to include more than one transceiver, or an additional receiver or transmitter to provide additional capabilities. As stated, in one embodiment, the transceivers are optical transceivers, however, alternative wireless transceivers can be implemented operating at wavelengths other than optical wavelengths.

The embodiment illustrated in FIG. 8 includes four node heads 654. Thus, in this embodiment and where each node head has a single transceiver, node 108 so configured can communicate with up to four other nodes 108 at four separate locations. Other numbers of node head 654 can be included, depending on the fan-out capability desired for the node 108. However, in one embodiment, four node heads 654, each with a two-way transceiver, is the preferred configuration.

Preferably, in one embodiment, each node head 654 includes a pointing mechanism such that it can be rotated to point to a designated other node 108. In one embodiment, such pointing can be performed in both azimuth and elevation. Ideally, each node head 654 can be independently pointed to a designated node 108.

Still further, the example implementation illustrated in FIG. 8 is substantially cylindrical in shape. This facilitates pointing to other nodes in a full 360-degree circle. One advantage of this shape is that an optical communication beam is always at a substantially right angle with respect to the cylindrical housing, regardless of pointing. This helps to maximize the transmitted beam power. Note that the housing for each node head 654 could also be shaped as a portion of a cylinder in the vertical direction to allow perpendicular passage of the beam through the housing as the beam is pointed in the elevation direction. Of course, alternative shapes for the housing can be implemented as well.

Note that in one embodiment, one or more node heads 654 can be implemented with the communications equipment to allow them to communicate with equipment other than another node 108. This equipment can be implemented using, for example, wireless RF communications or other communications techniques. However, in a preferred embodiment, node heads 654 are dedicated to inter-node communications via communication links 110.

Node base 656 can include the electronics and mechanics to provide a communications interface between, for example, a network 116 and the one or more node heads 654. A communications interface to perform protocol or format conversions can be included in the node base 656 as well as mechanics to drive the pointing of one or more node heads 654.

Figure 9:
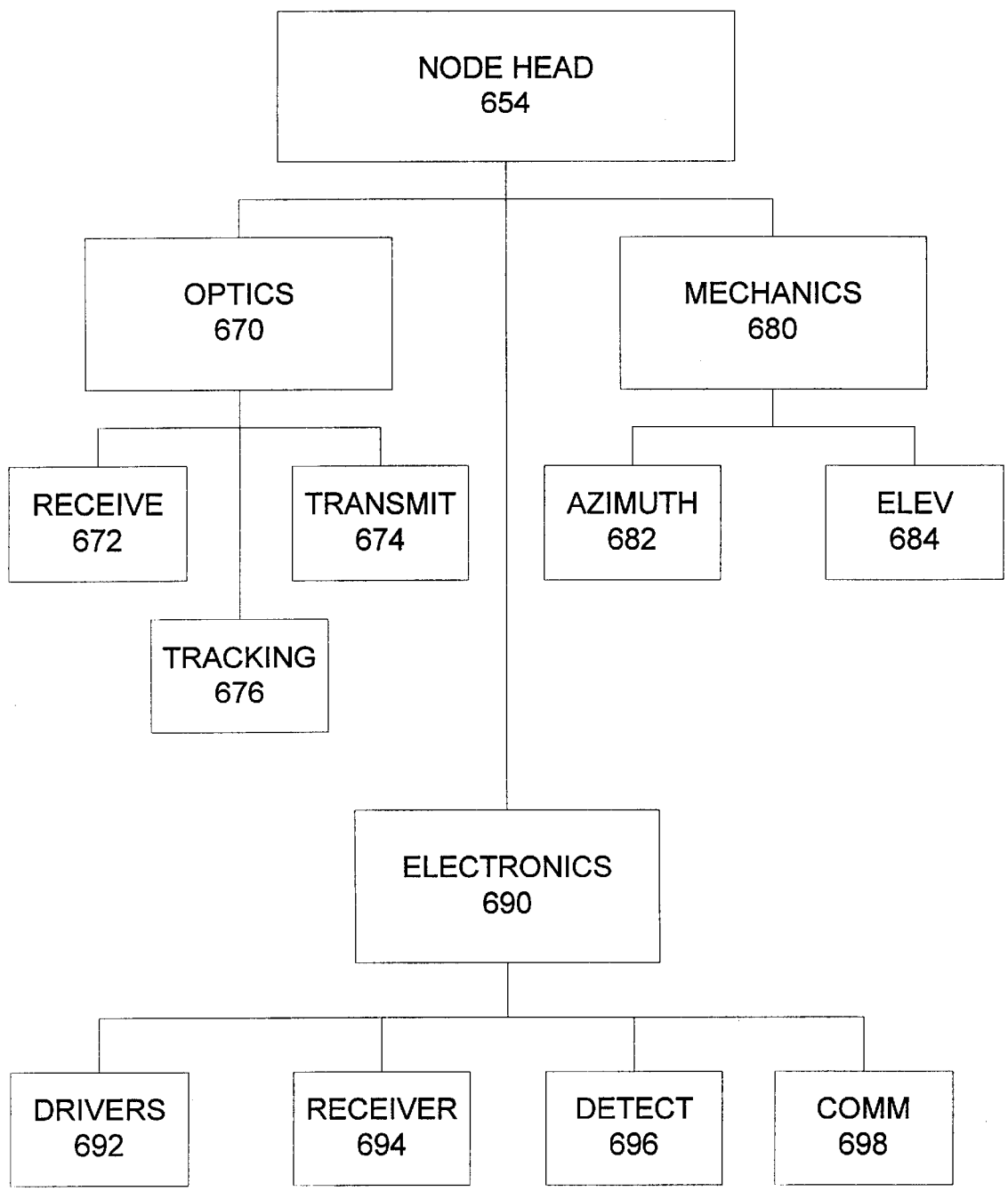
FIG. 9 is a block diagram illustrating a logical breakout of components that can be included in an example node head according to one embodiment of the invention.

The details of the node heads 654 and node base 656 are now described according to one embodiment of the invention. FIG. 9 is a block diagram illustrating a logical breakout of components that can be included in an example node head 654 according to one embodiment of the invention. This logical grouping is provided for discussion purposes only, and should not be interpreted to require a specific physical architecture for a node head 654. The embodiment illustrated in FIG. 9 is an optical embodiment, wherein the node head 654 communicates with other node heads 654 in other nodes 108 via an optical link 110.

Referring now to FIG. 9, the example node head 654 can have three logical groupings of components: optics 670, mechanics 680 and electronics 690. For node heads 654 having transceivers, the optics includes transmit optics 672, receive optics 674 and tracking optics 676. The optics can also include associated electro-optics such as, for example, a laser transmitter, a CCD detector, and so on. In one embodiment, the transmitter and detector are boresighted to each other during manufacture, such that bi-directional pointing accuracies can be established and maintained.

The mechanics 680 can include gimbal platforms and an enclosure to isolate the electronics from the elements. In one embodiment, gimbal platforms are an azimuth gimbal 682 and an elevation gimbal 684. This azimuth/elevation configuration is preferred in that it allows pointing to nodes 108 at a wide range of bearings. In one embodiment, each node head 654 is capable of rotating 370° in azimuth and ±20° in elevation for pointing to another node 108, although other ranges are permissible.

Note that other platforms can be used, including, for example, X-Y optical mounts. A motor or other drive mechanism can be used to drive the gimbals. In one embodiment, the motor is a belt-driven stepper motor, although direct drive motors or geared arrangements can be used as well. Optical encoders and limit stops/switches can be included to enable precise pointing.

The housing, in one embodiment, is an acrylic housing, transparent to the wavelength of communication link 110. The housing can also serve as a filter to filter out unwanted noise from wavelengths other than that of communication link 110. For example, in the embodiment discussed herein, where the communication wavelength is 780 nanometers (nm), the housing can provide a 780 nm band pass filter. In one embodiment, each housing is approximately 4.5 inches high and twelve inches in diameter, although other dimensions are possible. Preferably, the exterior dimensions are minimized to the extent possible based on the size and placement of components of node head 654.

For example, The electronics 690 can include the transmitter drivers 692, receivers 694, detection electronics 696, and communications 698. In one embodiment, the transmitter is a semiconductor laser diode modulated in the on off keyed (OOK) mode at approximately 780 nanometers (nm) wavelength at approximately 20 milliwatts (mW) average power. The divergence of the beam is preferably 1.5 milliradians (mrad), and is eyesafe at aperture. Of course, alternative technologies can be implemented with transmitters operating at different wavelengths, power, and divergence. Indeed, in RF applications, the wavelength of operation is not in the optical range of the spectrum.

The receiver can be implemented using an optical detector in optical embodiments. For example, in one embodiment, the receiver is implemented as a PIN or avalanche photodiode detector (APD) with a 50 mm aperture, to detect the total amount of transmitter power received. Although more sensitive than the PIN photodiode by approximately 10 dB, the avalanche photodiode is generally more complicated to implement. As such, the PIN detector is favored in applications where the link margin permits. Other detectors can be utilized to detect energy at optical or other wavelengths depending on the application.

The detection electronics can include, in one embodiment a quadrant PIN detector, with a 2 degree field of view, and located in the optical path of the receiver. Preferably, the quadrant detector is separated from the receiver by a 4% beamsplitter. The 4% fraction of the received signal is imaged onto a quadrant detector that generates an error signal, depending on the relative signal strength in each quadrant. The error signal is processed to determine a pointing offset. The pointing offset is used to generate an error signal to drive the azimuth and elevation gimbals 682, 684 to correct for the pointing error. In one embodiment a processor is used to maintain the tracking loop. The processor can provide other control and communication functions for node head 564.

In one embodiment, the photodetector is located at the focus of an 80-mm focal length, 50-mm diameter doublet lens. A 20 mm diameter, 20 nm (nanometer) bandwidth bent pass filter centered at 780 nm is located directly in front of the receive photo diode which is 600 microns in diameter. Light collected by the receive lens is imaged to a spot on the receive photo diode.

The communication electronics 698 is used to interface the node head 654 to node base 656. In one embodiment a bus connects the plurality of node heads 654 to node base 656. In this embodiment, a multiplexer can be provided as part of communication electronics 698 to allow communications among the various elements over a shared bus.

Each of these elements is now described in greater detail in accordance with one embodiment of the invention. As stated above, the transceiver (optical in one embodiment) is mounted on gimbals to facilitate pointing. In one embodiment, the transceiver is mounted on an elevation gimbal, which is in turn mounted on an azimuth platform. The elevation gimbal in one embodiment provides a field of movement of ±20 degrees, and the azimuth platform can rotate a total of 370 degrees about an axis. Thus, provided another node 108 is within the line of sight of node head 654, and within ±20 degrees of elevation, the two nodes 108 can be communicably connected.

In one embodiment, the gimbal axes are manipulated by belt-driven stepper motors. The stepper motors can be controlled by clock and direction signals provided, for example, by a processor in node base 656. Stepper motors cause the platforms to rotate in azimuth or elevation in discrete steps. Preferably, the platforms can be driven to a resolution that is approximately 10 times finer than the divergence of the transmit laser. Thus, in one embodiment where the divergence of the transmit laser beam is 1.5 mrads, the resolution of the gimbals is about 150 microradians ($\mu$rads).

Preferably, in one realization, the stepper motors drive toothed timing belts that are connected to the azimuth and elevation gimbals through toothed pulleys. Although other drive mechanisms can be utilized, the toothed belt mechanism is both highly accurate and cost effective. A toothed belt arrangement provides an arrangement that minimizes belt slippage. The motors have about 1.57 mrad per step resolution and an appropriate turn-down ratio. In one embodiment, the azimuth turn-down ratio is 9.28:1, and the elevation ratio is 12:1. This provides a spatial resolution of 169 $\mu$rads for azimuth and 130 $\mu$rads for elevation. In one embodiment, each motor has an internal gear drivetrain to reduce the motor armature motion. For example, in one embodiment, the gearing provides a reduction of 1000:1. This allows the motor to maintain its position, even when its drive coils are not energized.

In one embodiment, the gimbals are indexed to an absolute reference point to provide a reference for determining pointing. The reference point can be provided by limit switches positioned at the extreme ranges of motion on either axis. Thus at set up, or other calibration time, the gimbals are instructed to move to their limit positions, sending a signal to the microprocessor indicating their absolute position. The microprocessor can then use a signal from gimbal position encoders to maintain positional information and to drive the gimbals to a desired position.

As stated, in the above-described optical embodiment, the housing of node head 654 is an acrylic cylinder that is transparent to the 780 nm communication signal wavelength. In one embodiment, the acrylic can be deep red to provide thermal protection to the inner components. The top and bottom caps of the enclosures can be made from, for example machined aluminum. They can be provided with seals to keep out moisture or other undesirable elements. In one embodiment, the seals are O-ring grooves into which the top and bottom edges of the acrylic cylinders fit. A rubber, rubber-like or polymeric O-ring can be provided in the groove to provide a good seal. In a preferred embodiment, a single acrylic cylinder surrounds each of the node heads 654 in the node stack. The stack can be purged with dry nitrogen and sealed with a sealant. Preferably, there is sufficient space above the tope node head 654 to provide adequate air circulation. Although not strictly necessary, a thermoelectric or other temperature control device can be provided to maintain a desired equilibrium temperature. IN one embodiment, an equilibrium of approximately 12 degrees C above the ambient temperature is preferred.

Figure 10:
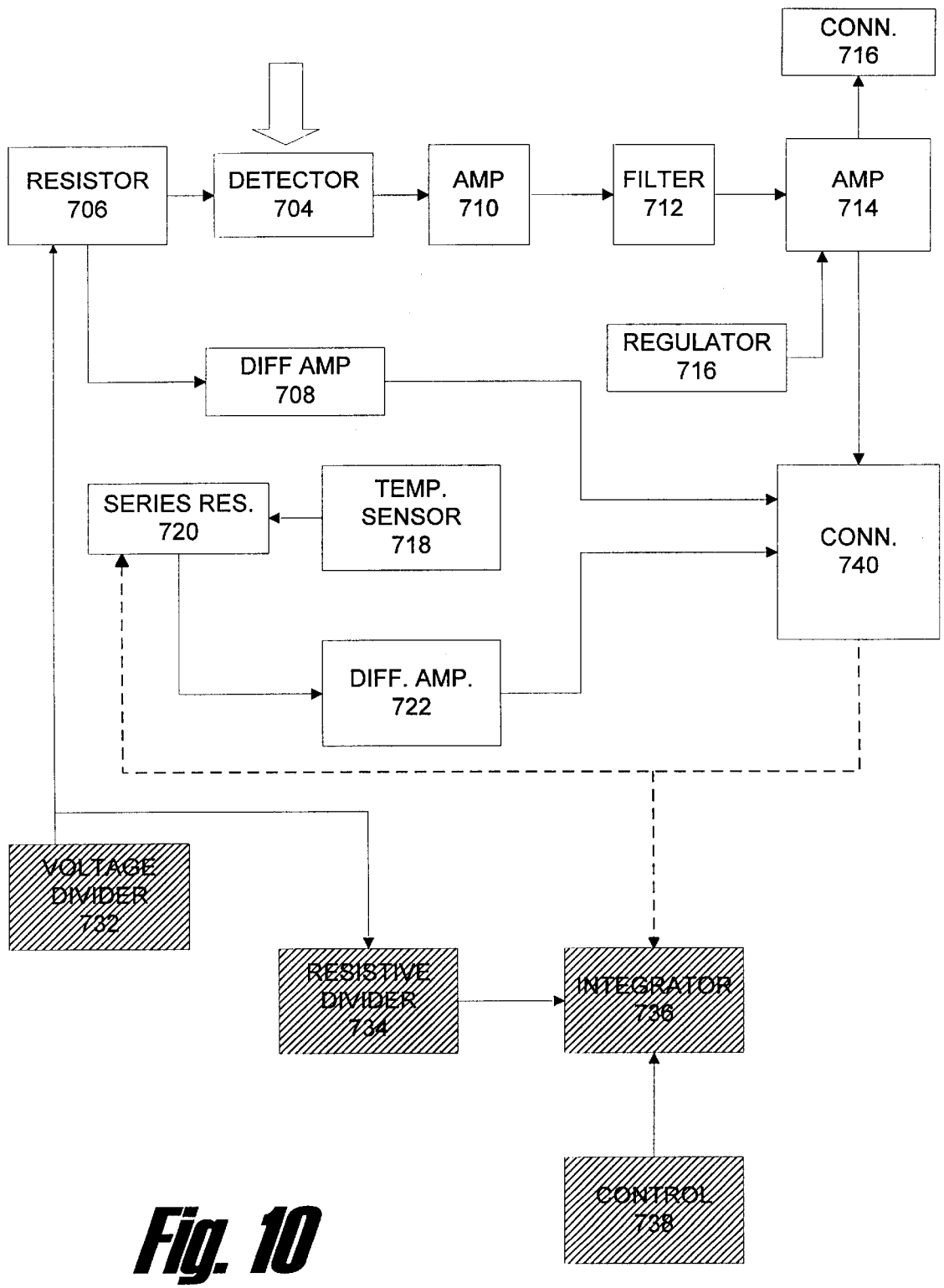
FIG. 10 is a block diagram illustrating an example implementation of a communication receiver circuit according to one embodiment of the invention.

FIG. 10 is a block diagram illustrating an example implementation of a communication receiver circuit 694 according to one embodiment of the invention. The purpose of receiver 694 is to receive a signal from another node 108 of network 100. Preferably, data being transferred from the other node 108 is modulated onto the received signal. Receiver 694 processes the received modulated signal such that it can be repeated or forwarded to another node 108 in network 100. Alternatively, the processed signal can be passed either to an end user at a facility 104 or to a network 116.

The example receiver illustrated in FIG. 10 is an optical receiver configured to receive the on-off keyed (OOK) data modulated optical signal. The receiver is further configured to convert the signal into a voltage level, and to amplify and retime the data with phase locked loop clock recovery. The operation of this example receiver circuit is now described. After reading this description, it will become apparent to one of ordinary skill in the art how receiver 694 can be implemented with other receiver detectors, architectures or configurations, or to receive signals modulated at wavelengths other than optical wavelengths.

In the embodiment illustrated in FIG. 10, light from a communication of link 110 is focused onto an optical detector 704. In one embodiment, the optical detector 704 is a high-speed optical detector such as, for example a PIN photodiode detector or avalanche photodiode detector. As stated above, in a preferred embodiment the PIN photodiode detector is preferred over the avalanche photodiode detector. However, also illustrated in FIG. 10 are components that can be included for an embodiment using an avalanche photodiode detector. These additional components are shown in FIG. 10 as being cross-hatched. These additional components provide control and temperature compensation of the high voltage bias supplied to the avalanche photo detector.

The PIN photodiode detector embodiment is first described. For a PIN photodiode detector, a bias voltage can be applied through a series resistance 706 to the cathode of the photodiode detector 704. In one embodiment, the bias voltage is 12 volts, although other bias voltages could be selected. The voltage drop across resistance 706 is a preferably proportional to the DC component of the light intensity (including background light), and is sensed and amplified by an amplifier, such as, for example, a differential amplifier 708. The output of differential amplifier 708 provides a received power indication signal.

When light from the data signal is focused onto the active area of the photo detector 704. Photo detector 704 generates a photo current proportional to the intensity of light impinging on the active area of photo detector 704. An amplifier 710 converts the generated photo current to a voltage signal. In one embodiment, amplifier 710 is implemented as a high-speed transimpedance amplifier, which converts the photo current to a differential voltage signal. An example implementation of a high-speed transimpedance amplifier is the Maxim MAX3664 transimpedance amplifier, available from Maxim Integrated Products, Inc of Sunnyvale, Calif.

The voltage signal can then be filtered by a low pass filter 712 to reduce high frequency noise prior to further amplification. In one embodiment, low pass filter 712 is a third order, 500 MHz, low pass filter, although other filters or band-pass frequencies can be used.

A data retiming and limiting amplifier 714 can be included to provide further amplification of the signal, re-time the data to a phase locked loop internal clock and route the signal to an output connector 740. In one embodiment, re-timing and limiting amplifier 714 is implemented using a Maxim MAX3675 device providing AC coupled differential ECL outputs, re-timed to a phase-locked loop internal clock at a nominal data rate of 622 Mbit/second. Other amplifiers can be implemented and can include alternative output levels and operate at alternative clock and data rates.

As stated, the output of amplifier 714 is routed to an output connector 716, which, in one embodiment, is an SMA-type connector for connecting to a high data rate switch at node base 656. Limiting and re-timing amplifier 714 can also provide a received signal strength indicator (RSSI), loss of lock signal and loss of power signal which can be provided for diagnostic purposes and for LED indications. As described below, the RSSI can be used to determine if the received signal is within the dynamic range of the receiver, or whether the effective transmit power should be adjusted. If needed, a voltage regulator 716 can be included to regulate the supply voltage provided to amplifier 714.

In one embodiment, a temperature sensor 718 can also be provided to generate a current signal indicating the temperature of the photo detector circuit. This is useful where the operation of the receiver is highly temperature dependent. In one embodiment, temperature sensor 718 provides a 10 millivolt per Kelvin (mv/Kelvin) signal through a differential amplifier 722. This signal can be used for diagnostic purposes. In the embodiment illustrated in FIG. 10, differential amplifier 722 senses a voltage dropped across a series resistor 720.

Various signals can be interface with receiver 694 via a connector 740. Diagnostic signals can be provided from receiver 694 to a processor or other device. These diagnostic signals can include signals such as, for example, signals indicating the temperature, received signal strength, and the DC received optical power. Connector 740 can also be used to supply voltage levels used for operation of the components in the communications receiver 694. In one embodiment, connector 740 is a 10 pin, 100 mil, dual-row header that is compatible with insulation displacement connectors (IDC) and ribbon cable for reduced parts and assembly cost, although alternative connectors can be used.

As stated above, where photodiode detector 704 is an avalanche photodiode, the components illustrated as cross-hatched can be provided. The high voltage bias for the avalanche photodiode detector 704 is provided by a high voltage divider 732 controlled through a sensing resistive voltage divider 734 and an op amp integrator 736. In one embodiment, the applied voltage can be manually adjusted using a control potentiometer 738, or externally set by removing potentiometer 738 and setting the high voltage control line to a voltage proportional to desired final voltage at the avalanche photodiode 704.

Figure 11:
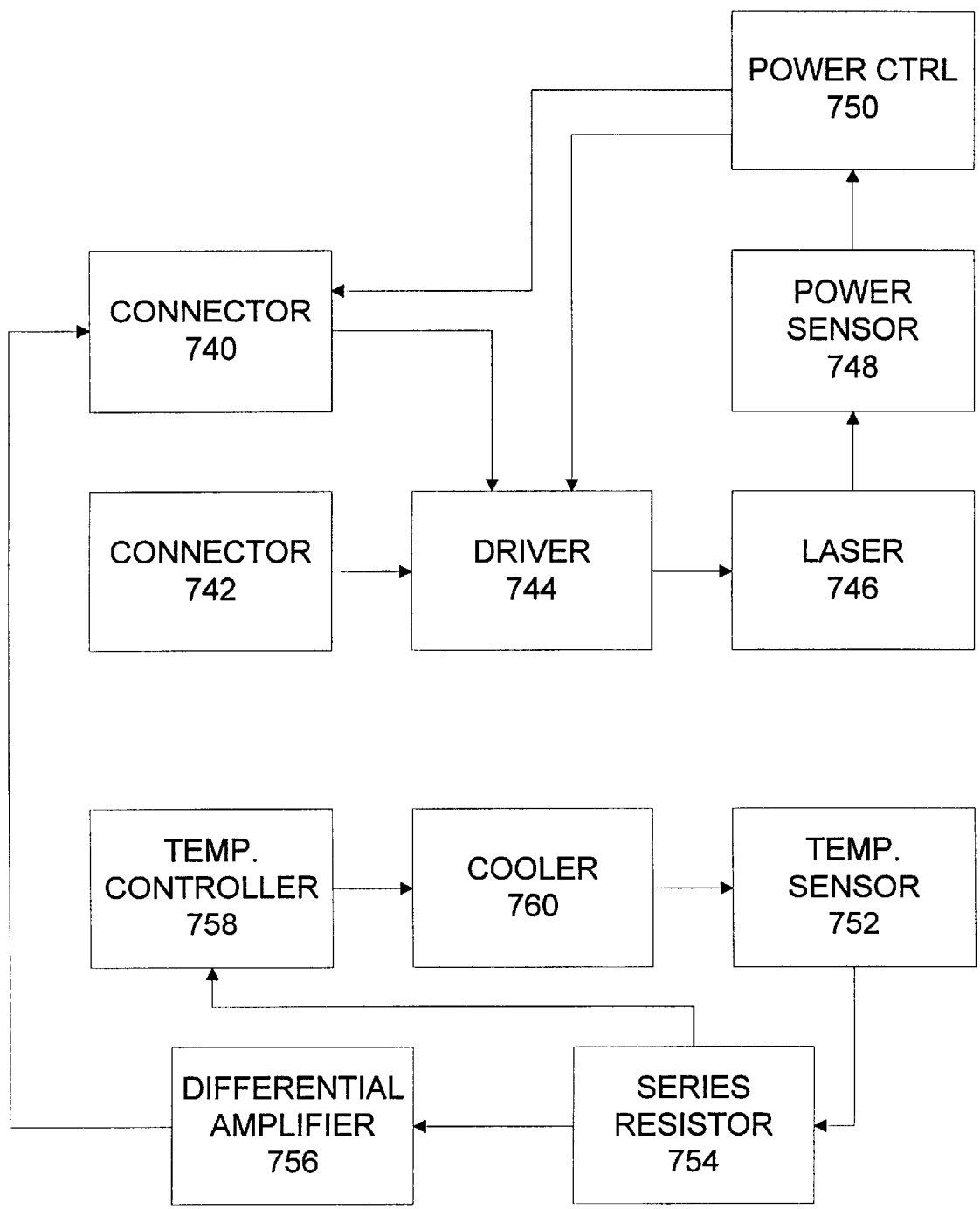
FIG. 11 is a block diagram illustrating an example implementation of a transmit circuit according to one embodiment of the invention.

FIG. 11 is a block diagram illustrating an example implementation of a transmit circuit according to one embodiment of the invention. Specifically, the embodiment illustrated in FIG. 11 is that of a laser transmitter, configured to transmit an optical signal across a communication link 110 to another node 108. After reading this description, it will become apparent to one of ordinary skill in the art how to implement the transmitter in alternative embodiments, including alternative transmitters, architectures or configurations.

In the embodiment illustrated in FIG. 11, data to be transmitted is received at a data input connector 742 and provided to a laser driver 744. As stated above, in one embodiment, the data is modulated at 622 Mbit/sec. Therefore, in this embodiment, laser driver 744 is preferably a high-speed laser driver. More specifically, in one embodiment, laser driver 744 is a current driver designed for operation at 622 Mbit/sec and is implemented as the Maxim MAX3766 laser driver that interfaces directly to the cathode of a communication laser diode 746. Alternative drivers can be used as well.

In one embodiment, communication laser diode 746 is mounted directly to the circuit board in close proximity to driver 744 to minimize signal degradation and EMI emission. The anode of laser diode 746 is connected to Vcc. In one embodiment, there is a laser enable feature on the MAX3766 that is controlled by a node base processor. An optical power sensor is used in a feedback loop with a laser power control circuit 750 to control the average output power of laser diode 746. Laser power control 750 also provides a diagnostic laser power output signal via a connector 740.

In the embodiment illustrated in FIG. 11, temperature control circuitry is also provided. A temperature controller is desirable as laser diodes tend to have much shorter lifetimes when their operating temperature is greater than approximately 40° Centigrade. As such, in this embodiment, a temperature sensor 752 is provided. In one embodiment, temperature sensor 752 is a temperature-to-current converter integrated circuit and is preferably mounted in close proximity to laser diode 746. In this embodiment, the voltage drop across a resistance 754 in series with temperature sensor 752 is sensed by a differential amplifier 756. Differential amplifier 756 provides a temperature diagnostic signal to a control processor via connector 740. If the processor determines that the operating temperature is too high, it can take corrective action. As one example, such corrective action can include disabling laser driver 744.

Also part of the temperature control circuit illustrated in FIG. 11, is a temperature controller 758 that senses the voltage drop across series resistance 754. Temperature controller 758 can be used to drive a cooler 760 to attempt to cool laser diode 746. Although other coolers can be used, in one embodiment, cooler 760 is implemented as a thermoelectric peltier junction cooler mounted directly to a wide copper top trace that also contacts the laser diode package. Thus, peltier junction can provide conductive cooling to laser diode 746.

As stated above, in one embodiment, the transmitter is a single mode laser diode operating at 780 nm with an output aperture of approximately three microns by five microns. The output aperture can be located at the focus of a 120-mm focal length, 50 mm diameter doublet lens. In one embodiment, a holographic diffuser can be included and disposed between these two elements. In one embodiment, the diffuser has a nominal intrinsic divergence of 1°. Positioning the diffuser about one-tenth of the distance between the laser diode and the objective lens produces a 1.5 mrad divergence output beam. In one embodiment, the focal length of the lens is chosen such that the average output power from the transmit aperture is less than 1.5 mW/cm$^2$, which meets the ANSI Z.136 standards for eye safety. In one embodiment, the beam profile is astigmatic exiting the laser, with a full width half maximum (FWHM) of about 23° in the parallel direction and 9° in the perpendicular direction.

Figure 12:
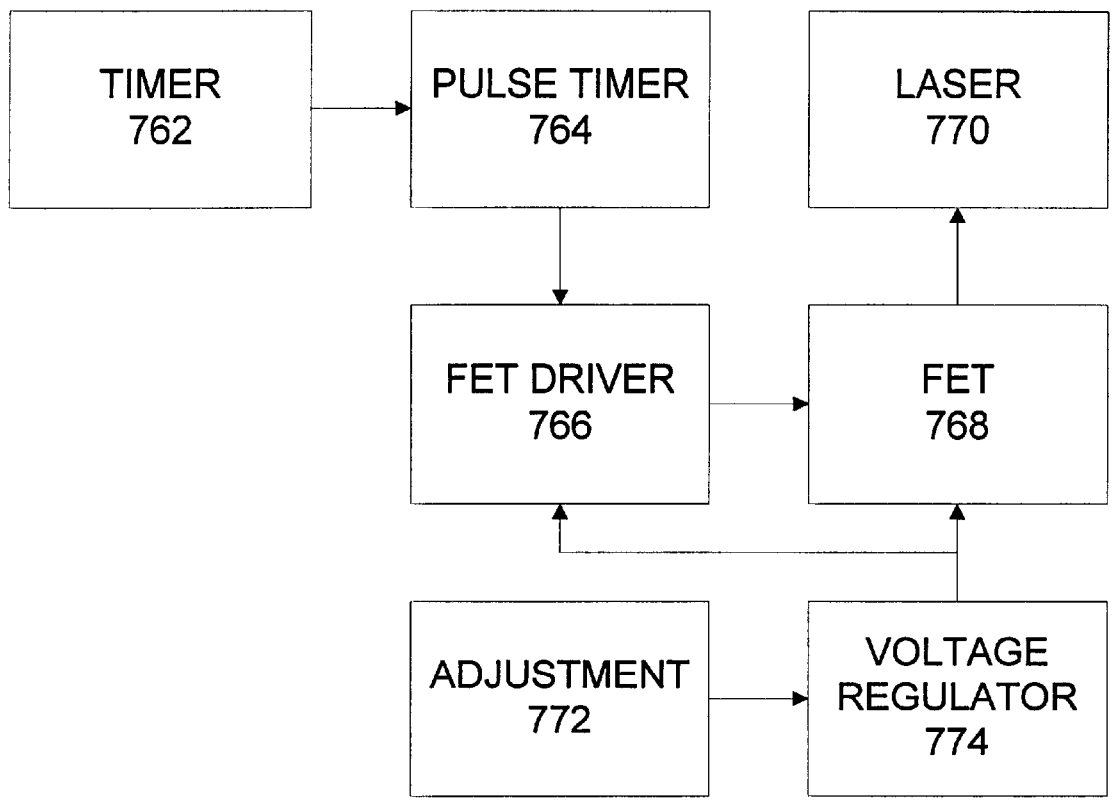
FIG. 12 is a diagram illustrating an example implementation of a beacon laser according to one embodiment of the invention.

FIG. 12 is a diagram illustrating an example implementation of a beacon laser according to one embodiment of the invention. The beacon laser can be implemented with a broader beam thereby reducing acquisition times where, for example, there is a large degree of uncertainty in positional information. In the embodiment illustrated in FIG. 12, beacon laser includes in a stable timer 762 a pulse timer 764, a high-speed driver 766, a high current FET 768 and a beacon laser 770. The beacon laser can also include a power adjustment potentiometer 722 and a voltage regulator 774. In operation, a stable timer 762 free runs, providing a clock signal. In one embodiment, the clock signal is provided at 660 Hz. The rising edge of this clock signal triggers pulse timer 764 which, in one embodiment, is a dual mono stable pulse timer that produces a one microsecond pulse. This one microsecond pulse drives high speed driver 766, the output of which is connected to the gate of a high speed, high current and channel FET (field effect transistor). FET 768 drives beacon laser 770 to provide a one microsecond ($\mu$sec) output pulse.

In one embodiment, the output is at a 20-watt peak power. Preferably, beacon laser 770 is mounted in close proximity to FET 768 to minimize signal degradation and EMI emission. Beacon laser 770 can also be mounted directly to the circuit board and heat sunk to the copper trace that contacts the cold surface of thermoelectric cooler 760. A voltage regulator 774 provides a bias voltage to driver 766 and FET 768. This can be adjusted manually by including a potentiometer 772.

Also included as part of the communications package in one embodiment is a multiplexer board. A multiplexer board can be used where signals among node heads 654 and node base 656 are communicated along one or more shared signal paths. The main purpose of the multiplexer board is to interface the communications receiver circuitry, detection circuitry, transmit circuitry, azimuth and elevation circuitry, to the node base 656. Preferably, in one embodiment, each node head 654 includes a multiplexer board located inside the node head enclosure. Thus, in this embodiment, a multiplexer board is required for each of the node heads 654 in a node 108.

Preferably, in order to minimize the number of electrical conductors that would be required to transmit the large number of tracking, diagnostic, and control signals among node heads 654 and node base 656, a multiplexing scheme is provided as this interface. In one embodiment, multiplexers, address lines, and a single coaxial input/output line are utilized. The address lines are bussed to each of the node heads 654, but one or more node heads 108 can have its own dedicated coaxial signal line. This can be used to reduce the wire count to a minimum number. Other multiplexing configurations can be used as well as a communication medium other than coaxial cable. Coaxial cable is preferred due to its ability to transmit high-bandwidth data with a minimum of noise.

In a preferred embodiment, the multiplexers are 8-channel analog multiplexers used to relay tracking error, diagnostic, and limit switch signals from one or more node heads 654 to node base 656. In addition, an 8-channel digital multiplex latch can be used to receive various digital command signals from the node base 656 via the signal interface. After reading this description, it will become apparent to one of ordinary skill in the art how other circuits, devices and techniques can be used to provide communications between and among node heads 654 and node base 656. For example, it is not necessary that signals relating to node head 654 be multiplexed to a shared channel. Alternatively, direct signal paths can be provided for the signals between node heads 654 and node base 656. The multiplexer board can also be used to provide power and ground signals to node heads 654.

Figure 13:
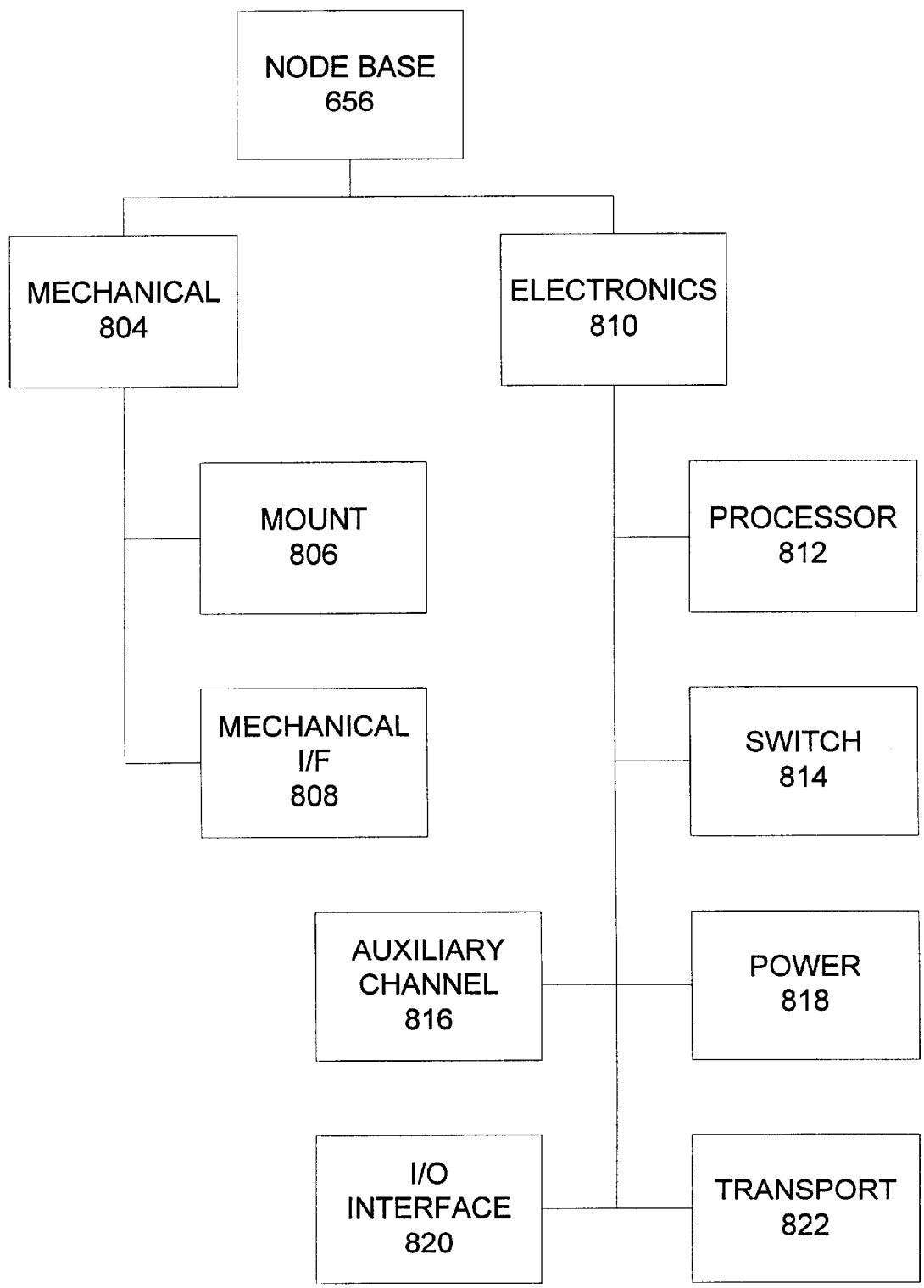
FIG. 13 is a block diagram illustrating a logical breakout of components of an example node base according to one embodiment of the invention.

One or more node bases 656 can be included in a node 108 to provide, among other functions, control of node 108 and to interface node 108 to facility 104 or a network 116. Alternatively, these functions can be delegated among one or more of the node heads 654. FIG. 13 is a block diagram illustrating a logical breakout of components of an example node base 656 according to one embodiment of the invention. This logical grouping is provided for discussion purposes only, and should not be interpreted to require a specific physical architecture for a node base 656. Referring now to FIG. 13, node base 656 includes mechanical components 804 and electronics or electrical components 810. The mechanical aspects of node base 656 include a mount 806 to mount node base 656 to facility 104, and structure utilized to interface power 808 to the node base 656. Electronics 810 can include, in the illustrated example, a processor 812, a packet switch 814, and auxiliary channel 816, power 818, temperature control 820, and transport interface 822. Each of these logical components is now described.

Base mount 806 provides a physical mount by which a node 108 can be mounted to the facility 104 premises. Preferably, in one embodiment, base mount 806 is implemented to provide at least two functions. One function that the base mount 806 can perform is that of leveling or otherwise adjusting the position or orientation of node 108. To this end, in one embodiment, base mount 806 can include a leveling device such as, for example, a mechanical ball joint apparatus, or other apparatus to allow leveling of the unit.

Additionally, the node 108 can include a level indicator for two dimensions so that node 108 can be leveled to a certain degree of accuracy. In one embodiment, base mount 806 allows leveling to an accuracy of about one-half to one-third of a degree in each axis, although other accuracy levels can be provided. In one embodiment, proper leveling of the node 108 enables more accurate pointing, as is addressed below.

A second function for base mount 806 is to provide a path for conducting heat from the node 108. Thus, base mount 806 can include heat fins or other apparatus to help cool node base 656 by convention.

A mechanical interface 808 can be included to provide an interface for power and signal lines and cables from facility 104 to node 108. Preferably, mechanical interface provides a degree of protection from the elements, restricting moisture or other undesirable elements from gaining access to node 108.

Electronics elements 810 according to one embodiment are now described. In one embodiment, an auxiliary channel 816 can be included to provide communications between a node 108 and another entity separate from or in addition to communication link 110 and network 116. The provision of such an auxiliary channel 816 can be provided for at least one of two or more purposes. One purpose would be to pass data to or from a new node 108 during installation of that node 108. Thus, before the node is interfaced to facility 104 or network 116, auxiliary channel 816 can be utilized to allow that node 108 to communicate with other entities to facilitate installation or to share data for other purposes.

Additionally, an auxiliary channel 816 can be used to provide an auxiliary communication channel with node 108 for communication during the field life of node 108. For example, the auxiliary channel 816 can be used to provide status or other signals to another entity, or to receive control signals or updates from another entity. In one example embodiment, the other entity referred to in this description is, for example, a central office or other office through which the network 100 can be controlled, monitored or adjusted. Auxiliary channel 816 can be used during installation and integration of a node 108 into network 100, or during operation of a node 108 within network 100. Functions and communications that can be provided in conjunction with the installation and integration process are described in further detail below, in the section of the document that describes an installation fixture.

In one embodiment, the auxiliary channel 816 can use a two-way paging protocol such as, for example, ReFlex 25 or 50 to pass data between node 108 and the central office or other network management application. ReFlex 25 or 50 is a Motorola proprietary protocol, although other protocols or formats could be used. The two-way pager can be connected to the main processor of a node base 656 using, for example, an RS-232 data link. In alternative embodiments, other communication formats or protocols can be used to provide the auxiliary channel 816. Preferably, the auxiliary channel is provided as a wireless RF communication link such that line of sight communication is not required.

Auxiliary channel 816 may also be used to communicate with a node 108 if that node 108 has otherwise "disappeared" from the network. Thus, if the other transport channels (i.e., channels 110) of the node 108 are not functioning, auxiliary channel 816 can be used. For example, auxiliary channel 816 can be used to send communications to and receive communications from the otherwise disabled node 108. In this application, auxiliary channel 816 can send status information back to the central office, which may give technicians an indication of a problem that may exist with the node 108. Thus, if a technician is dispatched to facility 104 to repair the disabled node 108, that technician can be better prepared having this information obtained before leaving the office. In one embodiment, auxiliary channel 816 can be battery powered or solar powered such that it can operate even in the event of a power failure elsewhere in the node 108.

Figure 14:
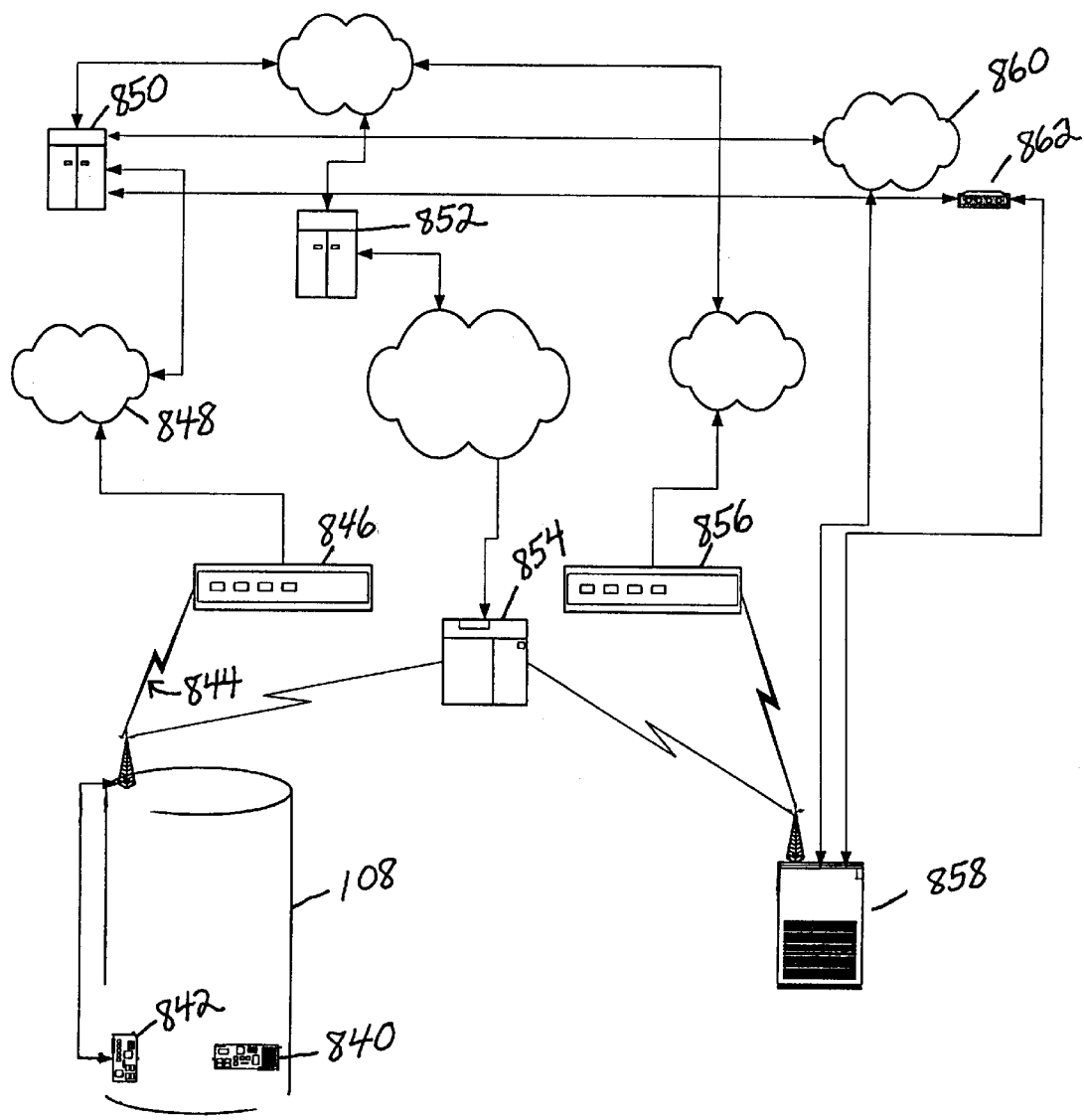
FIG. 14 is a diagram illustrating an example implementation of an auxiliary channel according to an embodiment of the invention using the ReFlex 25 or 50 protocol.

FIG. 14 is a diagram illustrating an example implementation of an auxiliary channel 816 according to an embodiment of the invention using the ReFlex 25 or 50 protocol. After reading this description, it will become apparent to one of ordinary skill in the art how to implement auxiliary channel 816 using other formats or protocols. Data from node 108 originating in a processor 840 is sent to a ReFlex based remote pager 842, preferably via an RS-232 interface. ReFlex remote pager 842 transmits this data over an auxiliary channel 816 to a receiver 846 such as, for example, a ReFlex 25 NPCS receiver 846. Receiver 846 provides these signals to an RF director 850. According to the ReFlex format, this is performed via a satellite link between receiver 846 and RF director 850. However, alternative links can be provided as well.

RF director 850 sends the data to either a paging terminal 852 and ReFlex transmitter 854 to provide the data to the central office 858 or, via the internet 860 or modem 862 to central office 858. The communication path operates similarly in the reverse direction. Central office 858 sends a communication to a local ReFlex receiver 856. This receiver provides the data to RF director 850 via a satellite link, which then downloads the data via ReFlex transmitter 854 to the node 108. Although modem and/or internet communications could be provided to node 108, they are not provided in the illustrated embodiment. Therefore, communications from central office 858 to node 108 are performed via transmitter 854. Although the above provided description with reference to FIG. 14 discusses a ReFlex communication in detail, other communication systems, protocols, or formats can be used to provide an interface via an auxiliary channel between node 108 and central office 858.

As stated above, in one embodiment data is transported across network 100 using ATM packets. Thus, in this embodiment, packet switch 814 is an ATM switch. For alternative embodiments, alternative packet switching can be provided. Additionally, for embodiments where communication among nodes 108 is not packetized, alternative interfaces for communication links 110 can be provided.

Also as stated above, in one embodiment the nodes 108 include the capability to interface to four separate communication links 110. Thus, in this embodiment, the nodes 108 are capable of multiplexing cell streams from downstream optical links as well as from the customer, on the input end. The nodes are also capable of multiplexing and one or more output cell streams for delivery to the next nearest upstream node 108. Specifically, in one embodiment, the node 108 can multiplex up to four cell streams: three from downstream optical links 110 and one from the customer. Preferably, the multiple streams are multiplexed into a single stream for delivery to the next upstream node 108 via a communication link 110. Of course, for different network configurations, these factors can be scaled accordingly. Additionally, additional capabilities can be provided to allow for expansion of the network 100.

Each node 108 can also demultiplex a signal into cell streams for communication to one or more other nodes via optical links 110 and to the customer in facility 104. In an example embodiment, such as for example that illustrated in FIG. 1, a 6×6 ATM switch is sufficient. Because, in one embodiment, the data rate is 622 Mbits/sec, the ATM switch operate at a OC-12 data rate. Other data rates can be selected depending on the application requirements.

In one embodiment, switch 814 is provisioned to accept network management commands such that it can create virtual paths. In other words, the routing tables of switch 814 are configured such that they are responsive to software-issued commands, allowing them to translate a virtual path identifier of each arriving cell to a predetermined routing. In addition, it is preferable that switch 814 includes diagnostic features, including an ability to report cell loss statistics to the central office. Such statistics can be included in the data stream via communications network 116, through an auxiliary channel 816, or otherwise.

ATM switches are generally well known in the art, and are therefore not discussed in more detail here. Generally speaking, the ATM switch detects an arriving cell, aligns boundaries of cells arriving on multiple input lines, inspects the VPI to determine the routing for a cell, converts the serial stream into a word parallel format, and time multiplexes the words onto time slots on a shared bus. A routing controller provides routing translation instructions to routing tables or accepts arriving virtual path identifiers from line interfaces to provide the correct routing instruction. A plurality of routing elements can be provided for each output. The routing element inspects the routing instruction associated with each word appearing on the shared bus, and delivers to its corresponding output cue only those cell segments intended for that output.

In the ATM embodiment, each output cue reassembles the arriving word into ATM cells and delivers each ATM cell to the corresponding output port in serial format.

I/O interfaces 820 can provide the ability to interface node base 656 to node heads 654 or other external devices. In one embodiment, the access port can be provided at the top of the top node head 654 to provide easy access to the I/O link after the node 108 has been installed at a facility 104.

In one embodiment, a diagnostic interface is included, and provides a communication link from node base 656 to an installation fixture or to an external diagnostic device. Although any of a number of link types can be provided, in one embodiment it is an optical link, in order to be able to maintain enclosure integrity. Thus, the access port for the diagnostic I/O is a window transparent to infrared radiation. In one embodiment, the diagnostic I/O is Infrared-based, such as IrDA (Infrared Data Acquisition).

A data input/output section can also be provided to allow data to be exchanged between node base 656 and node heads 654. In one embodiment where the node heads 654 are addressed, the data I/O includes a plurality of address lines that enable selection of a particular node head 654. This addressing capability is useful in embodiments in which the communication between node heads 654 and node base 656 are multiplexed communications. Of course, in embodiments where addressing is not necessary, these address lines do not need to be provided.

In one embodiment, address lines can also be provided and used to allow data to be written to various components in node heads 654 such as, for example, digital potentiometers, registers, or other devices or components. Another function of the data I/O 814 can be to digitize signals coming from node head 654 in the analog form such that they can be interpreted by a processor in node base 656. Where address lines are used, the number of lines can be determined based on the number of devices or components being addressed.

The electronics of node base 656 can also include a controller 812. In one embodiment, controller 812 is a processor-based controller 812. In one embodiment, a processor-based controller can be implemented using one or more microprocessors to provide the control and operation of node base 656. Additionally, controller 812 can control functions and operations of one or more node heads 654. Microprocessor controller 812 in this example embodiment can also include memory and interfaces to packet switch 814, auxiliary channel 816, and I/O 820.

One function of the controller 812 is to accept communication signals from network 816 and provide these signals to one or more node heads 654 for routing over network 100. These functions can be performed by controller 812 regardless of the data formats chosen for network 116 and network 100. However, it is as likely that processor will be asked to perform some level of protocol conversion, as most embodiments typically have different communication protocols on network 116 and network 100.

Although a number of different communication protocols can be supported, in one embodiment discussed above, network 116 utilizes OC3-C SONET signals from a customer. Transport board 882 is described in terms of this example implementation. In this embodiment, the concatenated SONET signals have been populated by customer central office equipment with ATM cells over the SONET structure. Thus, in this embodiment, transport board 882 can strip off the SONET overhead, and multiplex the four 155 Mbit/sec ATM streams into a single 622 Mbit/sec ATM stream. This single stream is then routed to packet switch 814 for routing across network 100 by one or more node heads 654. In one embodiment, this function only occurs in root nodes 108A of network 100, as it is root nodes 108A that are designated as communicating with communications network 116.

Another function that can be accomplished by processor 812 is to receive communications from a communications link 110 and provide those communications in a telecommunications protocol acceptable by the end user in facility 104. Although again, a number of communication formats and protocols can be supported, the function of controller 812 is now described with reference to the example embodiment discussed above. In this embodiment, the processor 812 accepts ATM cell streams at 622 Mbits/sec from switch 814. The stream is demultiplexed into four 155 Mbit/sec ATM cell streams, encapsulated with SONET, and provided to the customers NTU for delivery to the end user in facility 104. The signals can also be scrambled, coded, or provided with error checking such as, for example, a cyclical redundancy check (CRC).

In one embodiment of the invention, an off-the-shelf chipset can be used. For example, the OC3-C signals at root node 108A can be input into a chip-set such as the PMC Sierra Sonnet ATM mapper chip, the Lucent DETROIT quad ATM/SONET chip set or other mapping chip set. An overhead processor can be used to strip the SONET overhead from each signal and pass on the overhead information to microprocessor 880. The overhead processor can also provide processor 880 with pointer interpretation information to determine where in the SONET signal the payload resides. The payload is then passed to packet switch 814 for delineation, descrambling, decapsulation, and CRC verification. In one embodiment, ATM cells exit packet switch via a UTOPIA interface and are input into a 4 to 1 multiplexer for output as a 622 Mbit/sec ATM cell.

For destination nodes 108C, the 622 Mbit/sec ATM cell stream from one of node heads 654 is fed into a 1 to 4 demultiplexer where it is converted into four 155 Mbit/sec ATM cell bitstreams. These bitstreams are then fed into the Lucent DETROIT chip set packet/cell processor (or other commercially available chip set) for encapsulation, scrambling, and CRC generation. These bitstreams can then be sent to an SPE mapper and then overhead processor, where they emerge in standard SONET format for output to the customer's NTU.

Although this specific example implementation described above is provided in terms of specific components and communication formats, it will become apparent to one of ordinary skill in the art after reading this description that alternative communication formats and protocols can be handled, and the appropriate conversions implemented between communication network 116, network 100, and the end user at facility 104. Additionally, within the described protocols and formats, different bit rates and fan-out capabilities can be accommodated as well.

Processor 880 may use local memory 884 to assist in performing its functions. Memory 884 can include traditional RAM and ROM functions otherwise associated with processor-based systems. Although microprocessor 880 is illustrated as a single processor, the functionality can be implemented with one or more processors operating in conjunction with one another.

As described above, one or more embodiments of communication network 100 can include a plurality of nodes 108 to provide communication links 110 that make up the network 100. As further discussed above, the plurality of nodes 108 can each include one or more elements, referred to above as node heads 654, that enable implementation of the various communication links 100 across network 100. Specifically, in one implementation of the above-described network 100, each node 108 has one or more transceivers that point to another node 108 in the network.

In the case of a relatively narrow beam-width signal, it is important that the transceiver of a node 108 be pointed with a certain degree of precision to that of another node 108. This is especially important in applications where communication links 110 are implemented as optical communication links, where the optical signal has a relatively narrow beam waist and a small divergence. Additionally, accurate pointing is somewhat dependent on accurate positioning of nodes 108 within network 100.

Therefore, an installation fixture can be provided to facilitate the installation and integration of one or more nodes 108 within a network such as the above-described optical communication network 100. This installation fixture is now described in terms of an embodiment suitable for operation with the above-described optical communication network 100. After reading this description, however, it will become apparent to one of ordinary skill in the art how an installation fixture can be implemented for use in other applications where pointing or positioning are desired to be achieved with a certain level of precision.

Figure 15:
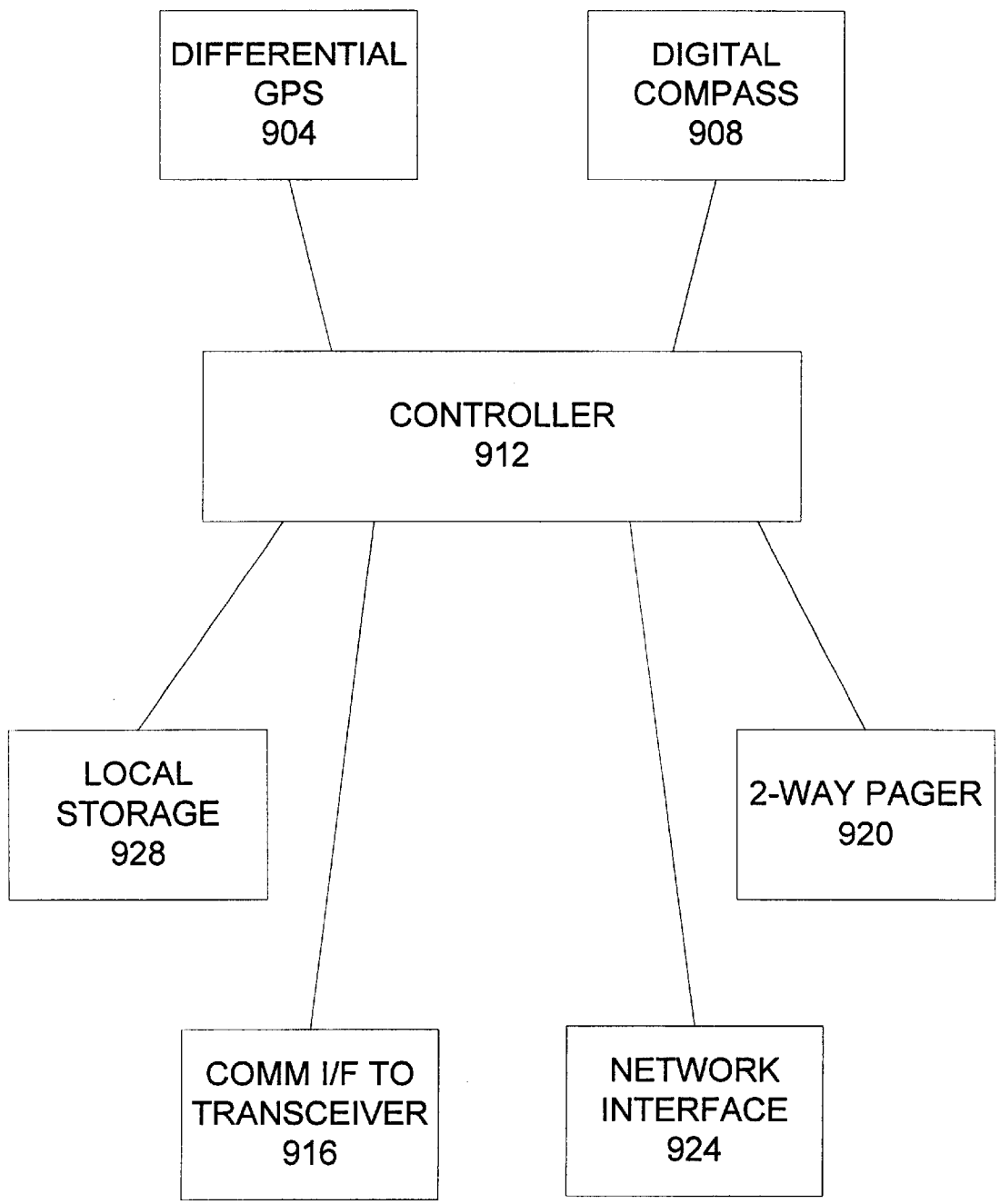
FIG. 15 is a block diagram illustrating an example implementation of an installation fixture in accordance with one embodiment of the invention.

FIG. 15 is a block diagram illustrating an example implementation of such an installation fixture in accordance with one embodiment of the invention. Referring now to FIG. 15, the example implementation of the installation fixture includes a global positioning system (GPS) receiver 904, a digital compass 908, a controller 912, an operator interface 916, an auxiliary channel 920, local storage 928, a communication interface 916 to transceivers, and a network interface 924. Each of these components, which can be included with an installation fixture, is now described.

In one embodiment, GPS receiver 904 is a GPS receiver capable of receiving GPS positioning information to enable determination of a location of the installation fixture. In one embodiment differential GPS is used to obtain increased accuracy in position determination over that of conventional GPS receivers. In certain embodiments using differential GPS, the position determination can be made to the meter or sub-meter accuracy level. Preferably, the GPS receiver provides X, Y and Z position determination relative to an earthbased reference such that the exact location of the installation fixture can be determined.

In one embodiment, the service for the differential GPS receiver 904 is provided by Fugro's Omnistar service. This service utilizes a geostationary satellite to provide positioning information good to approximately one meter. Other positional systems can be used such as, for example, traditional non-differential GPS, loran, or other positioning services or devices. Although a node 108 can be manually surveyed by a surveyor for position determination, it is preferable that an automated device such as, for example, a GPS receiver 904 be utilized. Such devices enable automated and more rapid position determination of the installation fixture. Once determined, the position information, usually expressed in terms of position coordinates (e.g., X, Y, Z position), is provided to controller 912.

In terms of the example network 100 described above, the installation fixture according to the invention can be mounted to a node 108. As such, the installation fixture can be used in the example network 100 to enable the integration of a node 108 within a network 100. Specifically, the installation fixture can be used to determine node parameters such as the location of the node 108 within network 100 as well as the node's orientation. This information can be used to facilitate pointing of various node heads 654 within a node 108.

A digital compass 908 can be provided to determine the orientation of the installation fixture. In one embodiment, the installation fixture is mounted to a node 108 such that the orientation of the installation fixture is in proper alignment with the orientation of node 108. In this embodiment, index marks, grooves, slots, channels, indents, keys, tongue-and-groove type fixtures, or other structures can be provided to allow a technician installing the installation fixture onto a node 108 to ensure that the two components are properly aligned with one another. These structures can further insure that this alignment does not change during the installation process.

Thus, determination of an orientation or "pointing direction" of the installation fixture provides determination of the bearing of the node 108 to which it is affixed. From this information, the pointing of the one or more transceivers within node 108 can also be determined. In one embodiment, this determination can be made using features such as, for example, the stops, limit switches and position encoders described above.

In one embodiment, digital compass 908 provides a bearing relative to magnetic north. In this embodiment, the bearing is provided in terms of degrees, where 0° is magnetic north and 180° is magnetic south. Additionally, digital compass 908 can be implemented to provide a correction from degrees relative to magnetic north to degrees relative to true north where desired. In applications of network 100 that span a relatively small geographic area, the error between true north and magnetic north is substantially uniform throughout the network 100. As such, in a preferred embodiment, this correction is not required nor is it performed. Such a correction, however, could be performed by a digital compass 908, or by controller 912, and is typically based on the geographic region in which node 108 resides. Preferably, digital compass 908 provides a bearing to 1/3° to 1/2° of accuracy which, as discussed below, is sufficient to allow transceivers to be initially pointed to a desired node 108. Alternative accuracy ranges can be used depending on the distance between nodes 108, transmit beam divergence, and receiver aperture.

In yet another embodiment, digital compass 908 can also provide roll, pitch and yaw information for the installation fixture. Thus, in this embodiment, digital compass 908 can provide information important to the leveling of the installation fixture, and thus the leveling of the node 108 to which the installation fixture is attached. For example, roll and pitch information can be used to determine whether the installation fixture (and hence the node 108) is level, or how far off of level the installation fixture is. This leveling information can be used to help level the node, or can be provided to the pointing systems to allow the roll and pitch offsets of the node to be taken into account in determining pointing angles to other nodes.

In the embodiment illustrated in FIG. 15, digital compass 908 provides its information (i.e., bearing) to controller 912. In one embodiment, digital compass 908 can be implemented using digital compasses such as those available from Leica or KVH, Inc. Such compasses provide a digital word or words indicating the pointing of the device.

Although not required, differential GPS 904 and digital compass 908 can additionally provide a visual display such that a technician can physically read the position bearing and, if provided, roll, pitch and yaw information from these devices. Providing this ability to a technician may be useful to facilitate the installation process. For example, the installation technician may use the roll and pitch information to level the node 108. This display can be via a display or displays provided on GPS 904 and digital compass 908, or via an independent display provided on the installation fixture.

The position and bearing information of the subject node 108, coupled with the position information of other nodes 108 in network 100, allows pointing information for the node 108 to be determined. Pointing angles for one or more transceivers in the subject node 108 determined with a fair degree of accuracy using this information in a simple triangulation computation. In other words, if the positions of the pertinent nodes 108 in network 100 are known, it is a straightforward geometric computation to determine where to point a given transceiver within the subject node 108, such that the transceiver is in alignment with a desired other node 108 in network 100.

This determination can be made, for example, by controller 912, assuming that controller 912 has available to it the positional information of pertinent nodes 108 in network 100. Information on the subject nodes 108 and pertinent nodes (i.e., nodes to which the subject node will directly interface) can be stored in local storage 928. Local storage 928 can also be used to store other information as well as program instructions to enable controller 912 to carry out its desired functionality.

Also included in the example architecture illustrated in FIG. 15 is an operator interface 916. Operator interface 916 can be a relatively simple and straightforward interface to allow a technician to control the installation fixture, and also, to enter data, if desired. Thus, operator interface 916 can include a simple key pad or other data entry device, as well as a display. However, in a relatively straightforward embodiment, operator interface 916 has only a start switch or a power switch that can be used to enable the installation technician to initiate the functionality of the installation fixture. Of course, no operator interface 916 is required as even the initiation of the installation fixture process can be automated. Such automated control can be provided by an auxiliary channel as further discussed below.

The embodiment illustrated in FIG. 15 also includes an optional auxiliary channel 920. Auxiliary channel 920 can be implemented similar to the auxiliary channel 816 described above. Auxiliary channel 920 allows an installation fixture to communicate with other entities such as, for example, a central office, independently of network 100. Therefore, auxiliary channel 920, which is preferably a wireless communication channel, allows installation fixture to receive instructions and other data from the central office, as well as to provide data and perhaps status information to the central office.

Thus, in one embodiment, controller 912 can send the position and bearing information to the central office where the central office can then determine the appropriate pointing information for one or more transceivers in node 108. This pointing information can then be relayed back to controller 912 via auxiliary channel 920 to enable the installation fixture to point the transceivers in the appropriate direction. Additionally, positional information for the one or more nodes 108 with which the subject node 108 is to interface, can be provided from the central office to the installation fixture via auxiliary channel 920. Thus, in this embodiment, controller 912 can be used to calculate the pointing information.

In both of these scenarios, as well as other scenarios for determining the proper pointing information, the installation fixture can use this pointing information to cause the various transceivers in the subject node 108 to point in the appropriate directions to establish communication links 110 with other nodes 108. As such, the installation fixture includes a communication interface 916. In one embodiment, this communication interface can interface with the pointing mechanisms in node heads 654 directly or via node base 656. Thus, the pointing information determined by the installation fixture can be used to control the pointing of the transceiver. In terms of the embodiment described above, the installation fixture interfaces with the azimuth and elevation gimbals in a node head 654 to point the transceivers in the appropriate direction. Alternatively, this interface can provide the information to a node base 656 such that the node base 656 can then control the pointing of node heads 654.

The installation fixture an also include a network interface 924. In this embodiment, network interface 924 can be used to allow the installation fixture to communicate with other entities, including other nodes 108, the central office or other entities via network 116. Network interface 924 can, in one embodiment, be provided as an interface via node base 656, or where the subject node 108 is not a root node 108A, via interim communication link 110 hops. Of course, where the subject node 108 is not installed in network 110, this latter scenario is not practical.

Although the installation fixture has been described with reference to the example architecture illustrated in FIG. 15, it will become apparent to one of ordinary skill in the art after reading this description that the installation fixture can be implemented in a number of alternative architectures, and is not limited to the architecture illustrated in FIG. 15.

Figure 16:
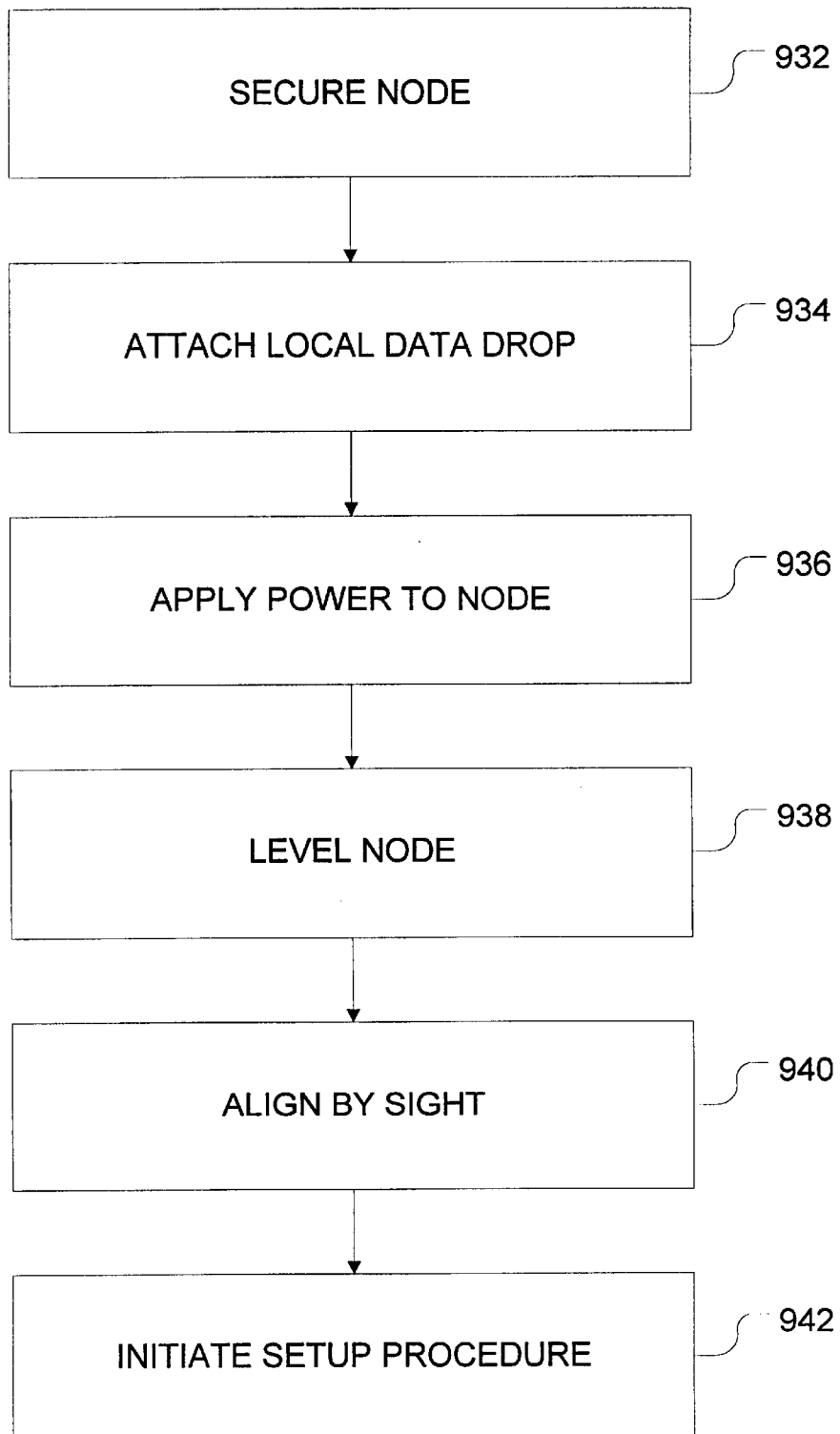
FIG. 16 is an operational flow diagram illustrating a process for using an installation fixture to determine the pointing of a node or the components thereof according to one embodiment of the invention.

FIG. 16 is an operational flow diagram illustrating a process for using an installation fixture to determine the pointing of a node or the components thereof according to one embodiment of the invention. Referring now to FIG. 16, in a step 932, an installer secures the node 108 to facility 104. This step can be performed, for example, by bolting node 108 to a mount, tower or other structure at facility 104. Once the node is secured, a data drop can be attached to interface node 108 to the communications infrastructure of facility 104. This is illustrated by a step 934.

In a step 936, power is applied to the node such that it can be made operational. In a step 938, the installer can level the node using a mechanical level such as, for example, a bubble-type level. This can be a separate level resting on the surface of node 108, or a level integrated into node 108. Alternatively, the level can be provided on the installation fixture, and the leveling performed after the installation fixture is affixed to node 108. In some cases, it is desirable that the leveling be performed with the installation fixture affixed to node 108 such that installation of the fixture after leveling does not offset the leveled condition of node 108.

In one embodiment, the installer can also use a hand-held compass to provide a rough orientation of the node 108. This can be accomplished by including a line or other mark on the installation fixture or on the node 108 to allow the installer to roughly align the node 108 by sight. Because, as described above, the installation fixture includes a means to accurately determine the bearing, this manual alignment step is not critical. Alternatively, depending on the implementation, it may be desirable to provide a rough orientation of the node upon installation.

Once the node is secured to facility 104, an installation fixture can be mounted to the node. Various structural components can be provided to facilitate attachment of the installation fixture to the node 108. Preferably, index marks or other structure is provided to enable the installation fixture to be mounted in a particular orientation with respect to node 108. It is also desired that this installation be relatively rigid such that the installation fixture cannot easily or substantially move with respect to node 108. Therefore, positional and bearing information that can be determined using the features of the installation fixture as described above, can be applied to node 108 relatively accurately, without the concern for error being introduced due to imprecise mounting.

In one embodiment, the mounting capabilities of the installation fixture to a node 108 are provided such that the installation fixture can be easily released from node 108 after the initial installation is complete. Preferably, the removal can be done without having to be concerned that the position and orientation of node 108 has been affected or altered due to the removal of the installation fixture. This can be facilitated by releasable mounts between the installation fixture and node 108, and secure and stable mounting of node 108 to facility 104. In one embodiment, the installation fixture can simply rest on node 108 and use friction and its own weight to maintain a fixed mounting. Additionally, grooves, pins, slots, or other structures or devices can be used to facilitate a fixed-orientation mounting of the installation fixture to the node.

In a step 942, the installer initiates the installation process. That is, in one embodiment, the installer enables the installation fixture. This can be accomplished, for example, through operator interface 916 where the installer effectively turns on or otherwise enables the installation fixture. As stated above, this can be provided by a simple button or switch that initiates the installation fixture once power has been applied.

Alternatively, more complex input can be provided by the operator where operator interface 916 allows this flexibility such as, for example, by providing a key pad, keyboard, pointing device or other data entry device to allow data or instruction to be entered into the device. In yet another alternative, once power is applied, the installation fixture process can be initiated via auxiliary communication channel 920. Thus, in this embodiment, the installer can physically install node 108 and the installation fixture to provide power to the units and depart the scene. At any time thereafter, the central office can initiate the installation procedure remotely. Thus, the installer does not need to remain on site during the installation procedure. In this embodiment, the installer can return to the site at a later date to retrieve the installation fixture.

However, because the installation fixture process can be completed in a relatively short period of time, this alternative embodiment may not be used. As already alluded to, once the installation fixture process has been completed, the installation fixture can be removed. In an alternative embodiment, the installation fixture can remain a permanent fixture to node 108. However, because node 108 can be releasably mounted to facility 104, it is not necessary that the installation fixture remain with node 108. That is, in the preferred embodiment, once the positional and pointing information are obtained, the installation fixture can be removed from the site.

In one embodiment, the installation fixture can be removed as soon as positional and bearing information are determined from GPS 904 and digital compass 908. In this embodiment, this information can be provided to node base 656, and paging channel 816 of node base 656 can be used to interface with the central office to complete the pointing and alignment procedures for node head 654. Alternatively, in the installation fixture uses its paging channel or auxiliary channel 920 to communicate with the central office, to instruct the node heads in the correct initial pointing.

In yet another alternative, each node 108 can include a GPS receiver 904 and a digital compass 908 to enable the controller 804 of node base 656 to perform the initial pointing operations. However, this alternative may be undesirable as the costs of the GPS receiver 904 and digital compass 908 are incurred for each of the nodes 108 having these components. Therefore, it is advantageous that these components be removably provided through the installation fixture.

Figure 17:
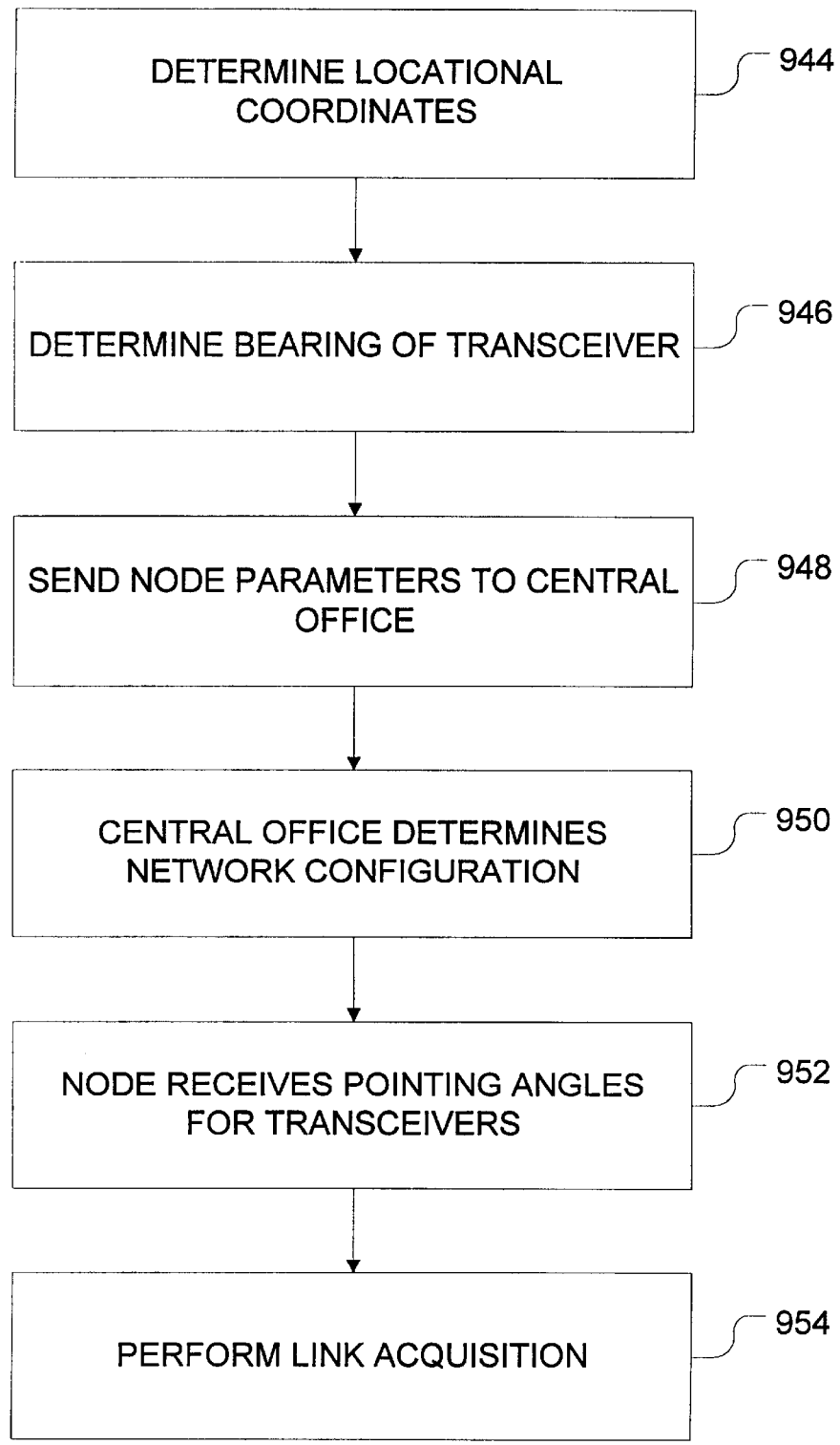
FIG. 17 is an operational flow diagram illustrating an example process by which a node can be initiated using an installation fixture according to one embodiment of the invention.

FIG. 17 is an operational flow diagram illustrating an example process by which a node 108 can be initiated using an installation fixture according to one embodiment of the invention. Referring now to FIG. 17, in a step 944, the installation fixture utilizes its positional receiver to determine locational coordinates. As described above, in this step, a GPS receiver, for example, can be used to determine the X, Y, and Z position of the installation fixture. Because the installation fixture is attached to the node 108, this provides the coordinate position of the node 108. In one embodiment, these locational positions are provided relative to a frame of reference fixed on the earth. Alternatively, the positional information can be determined relative to a frame of reference on the network 100. However, because GPS and other commercial position determination components are readily available, a preferred embodiment utilizes such commercial off-the-shelf equipment.

In a Step 946, the digital compass 908 is used by the installation fixture to determine the bearing of the node 108. Because the installation fixture is fixedly mounted to the node 108, determination of the bearing of a digital compass on the installation fixture can be used to determine the bearing of node 108. As described above, appropriate markings or the appropriate mounting structure can be provided to ensure that the installation fixture and the subject code 108 are appropriately and fixedly aligned to one another.

Once the node parameters (e.g., position and bearing) have been determined, in a step 948 they are sent to the central office. As discussed above, in one embodiment, they are sent to the central office via an auxiliary channel 920. As stated, auxiliary channel 920 can be implemented, for example, as a paging channel or other wireless communication channel. Although a hard-wired channel could be implemented, such an implementation is impractical for most applications. Therefore, a wireless communication is preferred for auxiliary channel 920.

In a step 950, the central office determines the configuration of network 100 with node 108. That is, the central office determines which other nodes 108 in network 100 the subject node will be linked via communication channels 110. In one embodiment, this can be performed by an application such as a network management application running on a server, work station or other computer in the central office. Additionally, an operator can determine the network configuration as well.

Once the network configuration is determined, the appropriate pointing angles for one or more transceivers in node 108 can be determined. Those angles used to point a transceiver in the subject node 108 to another node 108 in network 100 to establish communication channel 110. As described above, in one embodiment, the network is implemented using azimuth and elevation pointing gimbals. Thus, these angles can be determined in terms of azimuth/elevation coordinates to be provided to a node head 654 to point that node head's transceiver to the appropriate node 108.

As stated, this angle determination can be made at the central office, within the installation fixture, or by node base 656. The parameters used to enable automated determination of the pointing can include the locational information of the subject node, and the node with which a given transceiver is to interface.

In a step 954, node 108 performs link acquisition. That is, in the above described embodiments, transceivers on node heads 654 are pointed to the appropriate target node 108 using the pointing angles determined in step 952. In one embodiment, this pointing accuracy as determined using the installation fixture is adequate to configure the node 108 for operation in network 100. Depending on parameters such as transmitter power, receiver dynamic range, transmit beam divergence, receiver aperture, and other parameters depending on the type of communication equipment used to implement communication link 110, this degree of pointing accuracy may be sufficient. However, in alternative embodiments or applications, a higher degree of pointing precision may be required. Techniques for refining the pointing in this regard are described in more detail below.

Figure 18:
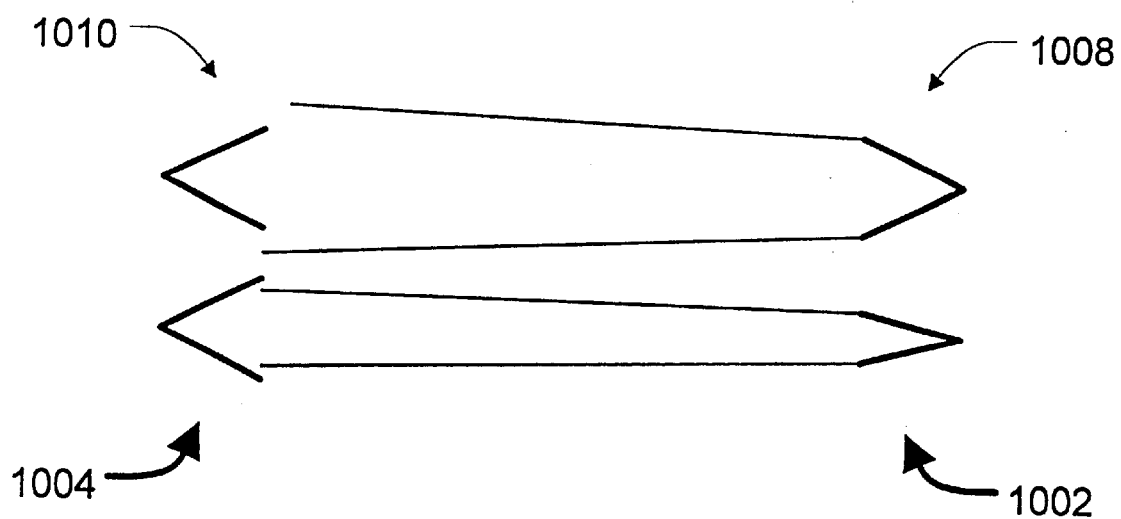
FIG. 18 is a diagram illustrating an example optical communication system using a second transmitter/receiver pair to align the optical components.

In some optical-based communication systems, a second transmitter and receiver pair are included at either end of the communication link to facilitate alignment of the optical components at either end. FIG. 18 is a diagram illustrating an example optical communication system using a second transmitter/receiver pair to align the optical components.

Referring now to FIG. 18, the communications system includes a communication transmitter 1002 and a communication receiver 1004. Preferably, to optimize performance of the system, communication transmitter 1002 has a relatively narrow beam waist and a relatively small divergence.

For example, it is not unforeseeable that a laser communication system can have a transmitted beam divergence of 1.5 milliradians (mrads), and a threedegree field of view at the receiver 1004. Because this small degree of divergence results in an extremely narrow beam waist at the receive end, a system such as this is difficult, if not impossible, to align manually. Therefore, a second transmitter 1008 and a second receiver 1010 can be added to the communication link in one embodiment. Preferably, a second transmitter 1008 is operating at a wavelength different from communication transmitter 1002 and also has a wider beam divergence. In some instances, the divergence of second transmitter 1008 can be a factor of 10 to 20 times greater than that of communication transmitter 1002 depending upon how much power is available for transmission over the link, and how rapidly the installer may want to acquire the receiver at the other end of the link.

Often times, second receiver 1010 is a spatial receiver such as a charge coupled device (CCD), quadrant detector or other detector offering spatial information about the received signal. As such, information about where the transmitted alignment beam from second source 1008 strikes receiver 1010 can be determined. Using information from the spatial detector, the transmitter or the receiver can be adjusted such that the transmitted beam impinges on the desired location of the spatial detector.

Typically, this is done by looking at the center of the beam as defined by a power roll-off level. Thus, the beam's center can be chosen, for example, to be centered on the spatial detector 1010. However, a disadvantage of this system is that the additional components, i.e., the second transmitter 1008 and second receiver 1010 need to be provided at each transceiver to facilitate appropriate alignment.

In one embodiment, a new node 108 in the network 100 stares its receiver at each of the existing nodes to which it is supposed to connect. Because for many applications the uncertainty cone is smaller than the receiver field of view, the receiver does not need to scan for acquisition to occur. Thus, with a fixed receiver, the transmitter of the existing node can be scanned to center the beam or refine the pointing accuracy. One advantage of this is that as few motors as possible are operating simultaneously on each new node, thus reducing the power supply demand.

Advantageously, the features provided by the installation fixture can allow the initial alignment to be accurate enough such that second transmitter 1008 and second receiver 1010 are not needed. For example, with a transmit beam divergence of 1.5 mrads and a receive field of view of three degrees, and a node to node spacing of approximately 15 meters or so, the accuracy levels provided by the differential GPS 904 and the digital compass 908 allow pointing angles to be determined with a sufficient degree of accuracy such that transmitted beam from communication transmitter 1002 is scanned to fall within the three degree field of view of communication receiver 1004.

Thus, link acquisition can be obtained using the communication components without requiring a second transmitter 1008 and a second receiver 1010. However, it is often desirable that the pointing accuracy be improved over that obtained by the initial acquisition. Given the accuracy levels of the installation fixture components and the transmit/ receive parameters described above, at 15 meters separation there is still an uncertainty cone of approximately 10 degrees. This equates to approximately 400 spots that the 1.5 mrads transmit beam can impinge upon the received detector.

As stated above, in one or more embodiments, a spatial detector can be provided to determine the alignment of a transceiver in a communication link and to provide information to allow that alignment to be adjusted. Spatial detectors are available for both optical and RF detection and, in many ways, function quite similarly. As previously stated, in optical embodiments, spatial detectors can be implemented using charged coupled devices (CCDs), optical quad cell detectors or other spatial detection devices.

An optical quad cell detector is now described. However, after reading this description of an optical quad cell detector, it will become apparent to one of ordinary skill in the art how to implement a spatial detector using other optical or RF spatial detectors. The quad cell detector and its associated circuitry converts the light impinging onto the detector into a photocurrent, which is then converted into voltage. The voltage is amplified and discriminated from background light sources. As such, the quad cell detector and its associated circuitry produces voltages that are proportional to received power, azimuth, and elevation of pointing errors. In one or more embodiments described below, modulation can be added to an alignment signal to allow the alignment signal to be discriminated from other noise signals, such as, for example, background light or extraneous light sources.

Figure 19:
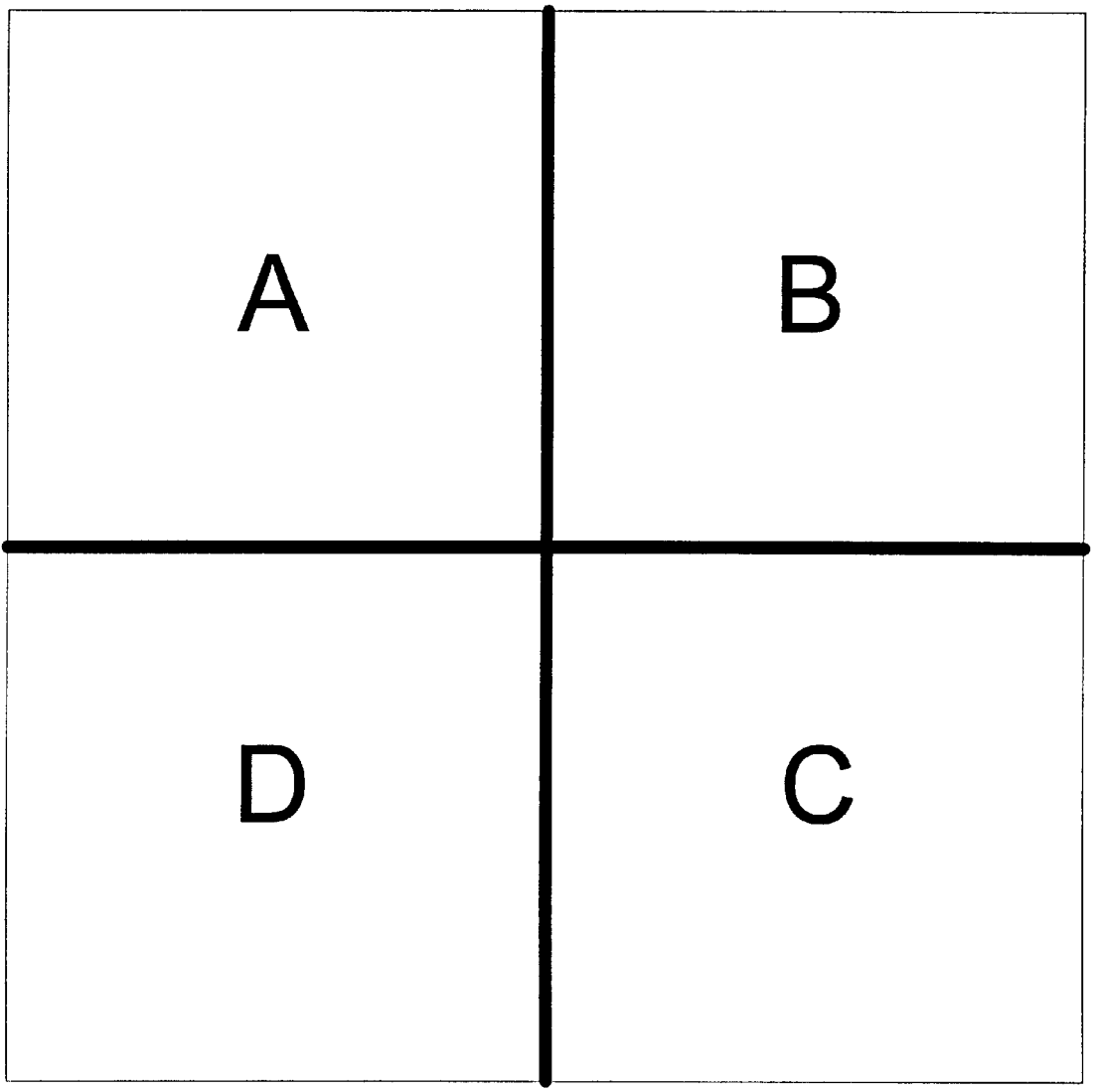
FIG. 19 is a diagram illustrating an example quadrant detector according to one embodiment of the invention.

An example quadrant detector is illustrated in FIG. 19. This example quadrant detector is divided into four segments, which are preferably equal in size. In one embodiment, the total size of the active area is 5×5 millimeters although other dimensions are possible. Because the light falling on the detector surface produces a photocurrent proportional to the intensity, the current from each quadrant can be detected to determine the spatial location of the beam impinging on quadrant detector 1022. In the detection circuitry, difference amplifiers can be used to determine the relative signal strength based on the photo current produced from each of the four segments. This information can be provided to a processor to determine azimuth and elevation errors, and a peak sum, used for normalizing the error values and diagnostics.

Therefore, in one embodiment, a beam splitter is provided in the received path to "pick off" a portion of the received communication beam and provide this beam to a spatial detector. In one embodiment, a four percent beam splitter is used to utilize four percent of the received signal strength and provide this to the communication receiver 1004. In one embodiment, the diameter of the beam splitter can be larger than the diameter of the receiver aperture at the point where the beam splitter is placed, such that regardless of the pointing accuracy, as long as the transmit beam is within the received aperture, a signal is detected by the spatial detector.

In one embodiment, spatial detector can be implemented using, for example, a CCD detector having a plurality of "pixels" or a quadrant detector or other spatial detector. This system can be implemented such that when a node is acquired, the transmit beam hits the node and dwells long enough to allow the beam to center on the spatial detector. Information from the spatial detector can be process by a processor such as the controller in node base 656 to determine a pointing error based on how far off center the received beam is impinging on the spatial detector. In one embodiment, this information is fed back to the pointing device for the transmitter such that the transmitter pointing can be adjusted to center the beam on the spatial detector. A similar spatial detector can be provided with the receiver located at the transmitter end such that pointing can be adjusted from both directions.

Figure 20:
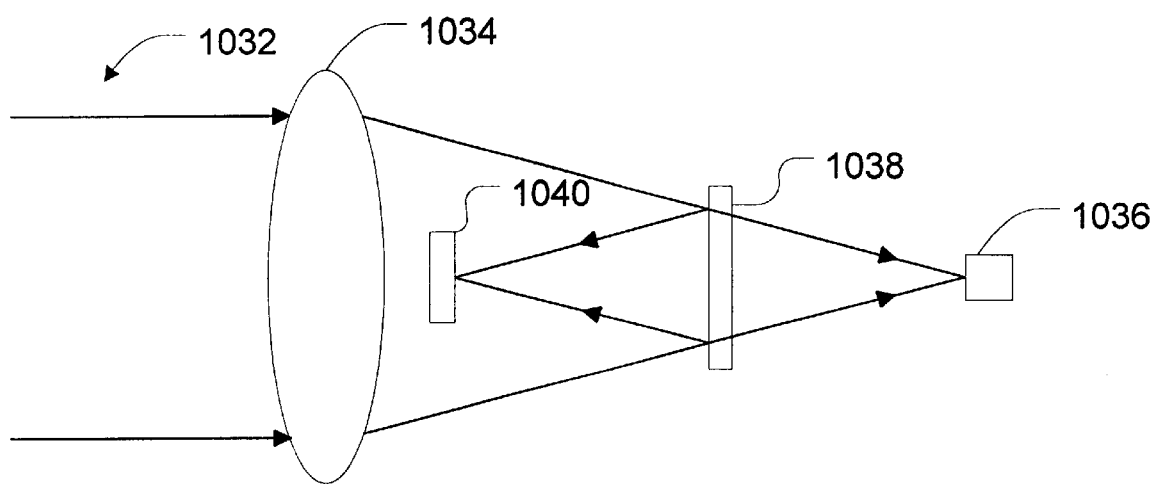
FIG. 20 is a diagram illustrating beam split light being reflected back to a spatial detector behind the main objective lens.

FIG. 20 is a diagram illustrating beam split light being reflected back to a spatial detector behind the main objective lens. Referring now to FIG. 20, a light beam 1022 from the transmitter impinges on an objective lens 1034. Light from the objective lens is focused onto a detector 1036. Beam splitter 1038 reflects a portion of the optical energy back to a spatial detector 1040. Spatial detector 1040 can then be used as described in this document to determine whether there are pointing errors in the system.

Figure 21:
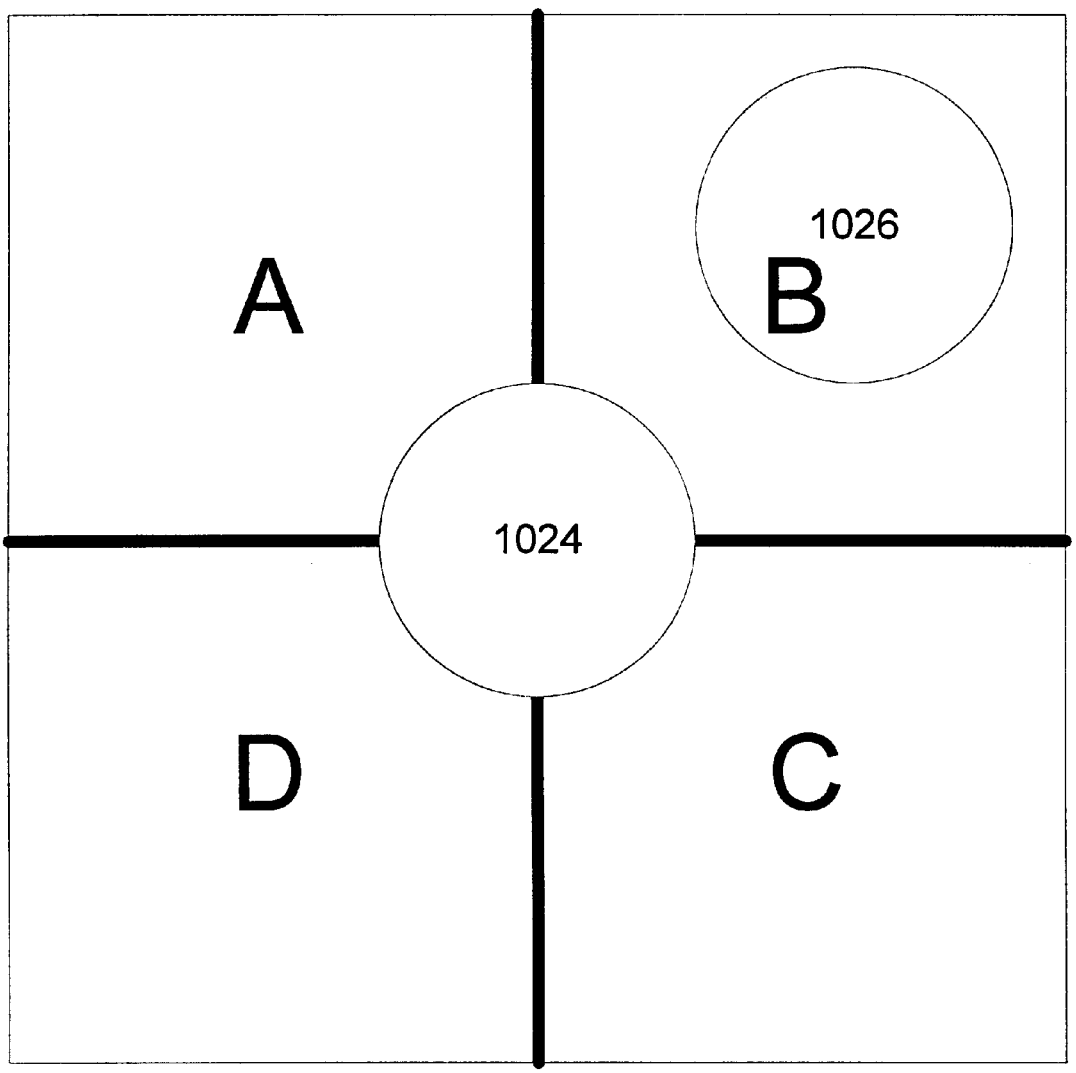
FIG. 21 is a diagram illustrating the phenomenon where an unwanted light source could potentially cause a pointing error.

Even using a spatial detector, pointing errors can be introduced due to noise or other unwanted light sources that may introduce noise into the system. For example, at nighttime a street lamp in the field of view of a receiver 1004 may be combined with the received communication signal on the spatial detector, fooling the system into thinking there is a pointing error. FIG. 21 is a diagram illustrating the phenomenon where an unwanted light source could potentially cause a pointing error. The example illustrated in FIG. 20 is illustrated with a quadrant detector 1022. However, after reading this description, one of ordinary skill in the art could appreciate that this scenario could occur with a CCD or other spatial detector.

Referring now to FIG. 21, quadrant detector 1022 is divided into four quadrants A, B, C, and D. Transmit beam 1024 is centered on quadrant detector 1022 as a result of a previous alignment. However, an additional light source is picked up by quadrant detector 1022 as extraneous light source 1026. Extraneous light source 1026 can, for example, be a street light, a setting sun, headlights from an oncoming vehicle, or other unwanted light source. Depending on the intensity of this source, filtering provided in the received path may not be sufficient to diminish the signal strength of this unwanted source 1026.

Therefore, unwanted light source 1026 may, to a certain extent, skew the result of the signals processed from the quadrant detector. Specifically, in the example illustrated in Example 20, extraneous light source 1026 will cause the system to think that the transmitter is pointing more toward the B quadrant than it really is. As such, the pointing may be adjusted even though the communication beam 1024 is exactly centered. As a result, the communication beam 1024 is now off center while the effect of the total power from communication beam 1024 and extraneous source 1026 are effectively "centered" on quadrant detector 1022.

One way to solve this problem is to provide a way for the spatial detector or other alignment detector, and its associated electronics, to differentiate between a communication signal 1024 and an extraneous signal 1026. If these two signals can be distinguished, the unwanted extraneous signal 1026 can be effectively ignored for alignment purposes. Because the communication signal has data modulated there on, one technique is to use this modulation to differentiate between the two signals. However, spatial detectors such as quad cells and CCDs typically have a low frequency response. Because most communication signals are modulated at a fairly high rate this modulation is not detected by the spatial detector.

For example, in an embodiment described above, data is modulated on communication links 110 at a rate of 622 MBPS. This is well above the cut-off frequency of the relatively low frequency response of spatial detectors. In fact, many contemporary spatial detectors exhibit a frequency response of 100 kHz or less. Therefore, because a communications signal such as, for example, a 622 MBPS signal is well above this low frequency response this signal appears like a DC bias to the spatial detector. Therefore, in one embodiment of the invention a low frequency tone is modulated onto the communication signal such that this low frequency tone can be detected by the spatial detector.

In one embodiment, the tone can be initiated by a microprocessor, but will be generated in hardware, for example, using a field programmable gate array (FPGA) in order to not unduly tax the processor.

Figure 22:
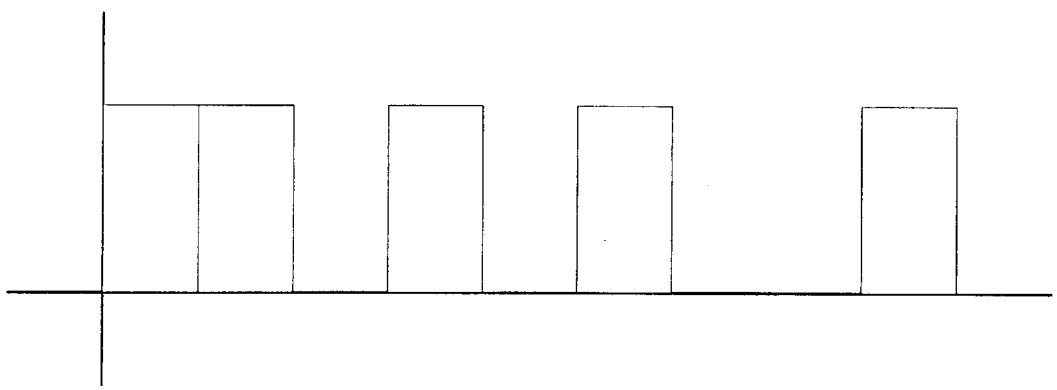
FIG. 22 is a diagram illustrating an example data signal that can be received by a receiver.
Figure 23:
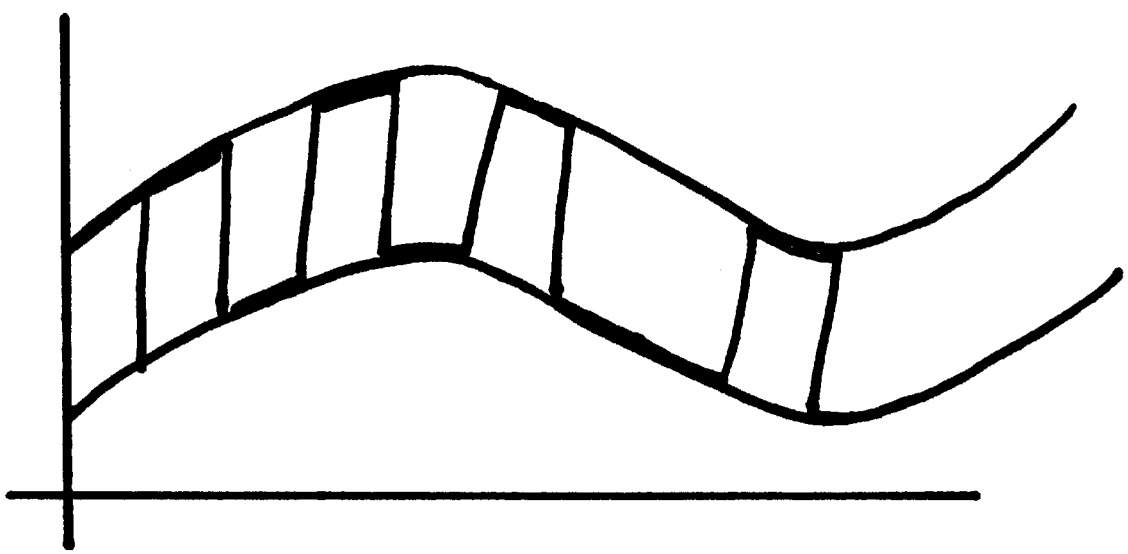
FIG. 23 is a diagram illustrating the modulation of the example data signal onto a low frequency carrier according to one embodiment of the invention.

FIG. 22 is a diagram illustrating an example data signal that can be received by a receiver. Because the signal is a digital signal, which, in one example embodiment is 622 megabits per second, the signal appears to the receiver as a series of ones and zeros. Thus, FIG. 22 is an example data stream of ones and zeros. When this data stream is modulated onto a low frequency carrier signal, the result is similar to the example illustrated in FIG. 23. As illustrated in FIG. 23, digital data stream 1144 is modulated onto a low frequency carrier 1148. As discussed, in one embodiment, this low frequency carrier is at approximately a 10 kilohertz frequency. As such, this frequency is within the frequency response of the spatial detector. Therefore, the processing circuitry of the spatial detector can discriminate between this signal and a noise source which generally appears as a DC-level signal.

In one embodiment, it is important to ensure that the transmit beam always meets eye-safety requirements. Therefore, in one embodiment, the modulation of the digital data onto a carrier signal causes an effective increase in the transmitter power. As such, such an increase can result in the transmitted power rising above eye-safe limits. For example, in one application, the modulation of the digital data onto a ten kilohertz carrier causes an effective increase in output power of a factor of 2. Therefore, the transmitter power would need to be reduced by 3 dB to compensate for this increase. Because this decrease could potentially impact the ability to detect the digital data, such a decrease in transmitter power is not desired. Therefore, in one embodiment, the modulation of the data onto a DC carrier is only performed periodically. This is possible because it is not necessary that the pointing adjustments be made with a high frequency. In fact, the tracking algorithm can typically run relatively slowly compared to the data signal. Therefore, the tracking algorithm is run in duty cycles and corrections are performed relatively infrequently. For example, in one embodiment, the tracking algorithm is ran in 10 cycles of the 10 kilohertz signal. Therefore, the data is only modulated onto the low-frequency signal at 5 to 10 second intervals. If, for example, the duty cycle is 1%, 0.10%, or 0.01%, the extra power is added to the transmitter for only a short period of time. Therefore, the laser power only needs to be turned down by a small fraction of the total power. For example, at a duty cycle of 0.01%, the laser power only needs to be turned down by a factor of 0.01%. This is possible because eye-safety limits are determined for signals over a period of time as opposed to determined instantaneously.

In one embodiment, nodes 108 are designed to have a 35 to 45 dB link margin for good performance in severe weather conditions. In order to provide this margin in severe weather conditions, the detector may receive light above and beyond its dynamic range in clear weather. Thus, in order to maintain light levels that are within the dynamic range of the detector, one or more additional features can be included.

In one embodiment, the transmitted beam is decentered such that the power reaching the detector can be attenuated without the use of additional optics such as neutral density (ND) filters. This embodiment is particularly useful in scenarios where the transmitted beam has a gaussian profile. In such applications, a portion of the signal, including the highest power portion, can be directed away from the receiver while a lower portion of the signal remains on the detector. As such, the signal can be controlled to drop back down within the dynamic range of the receiver. There are several techniques that can be used to accomplish this "decentered" pointing of the transmitted beam.

Figure 24:
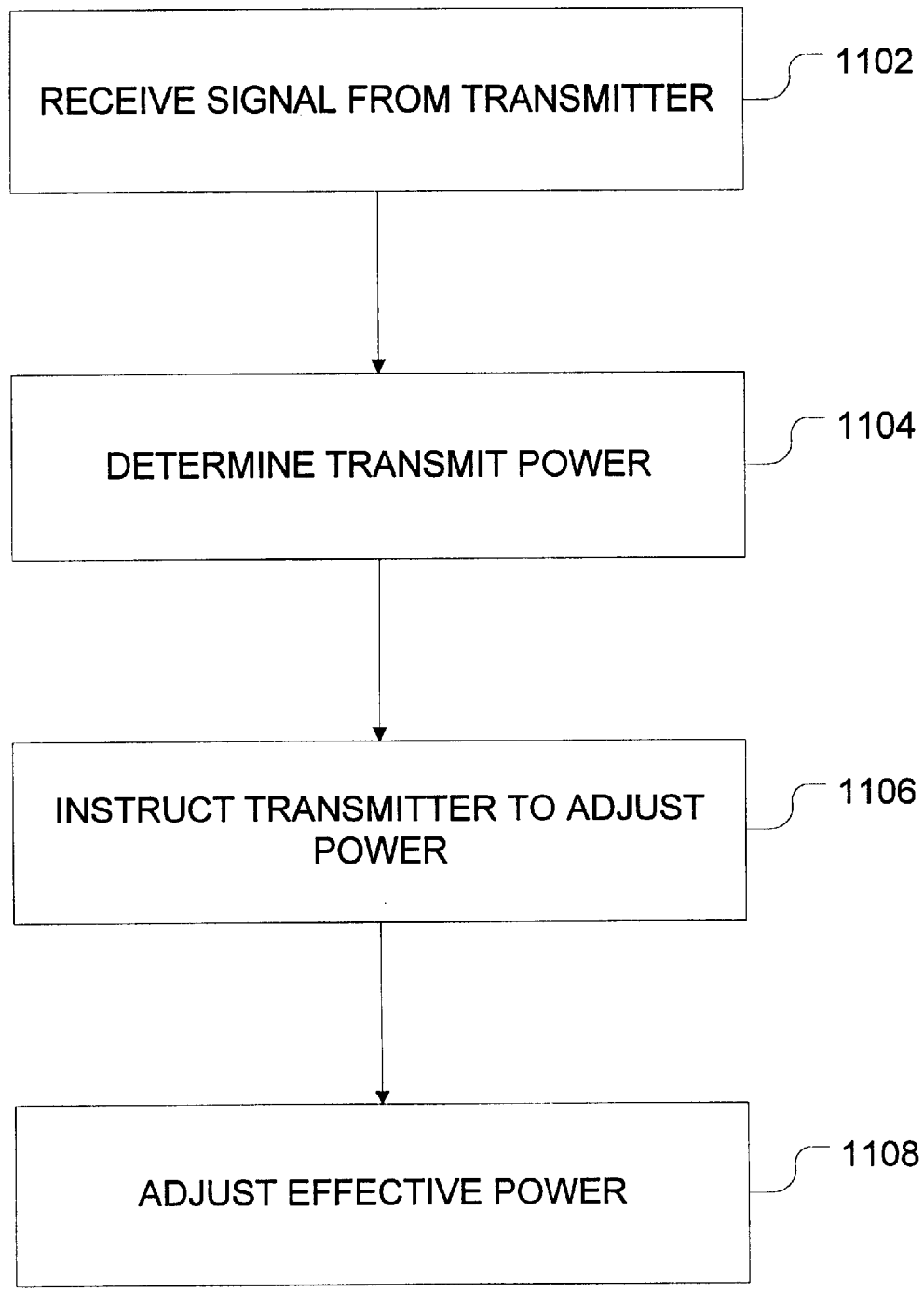
FIG. 24 is an operational flow diagram illustrating a process for decentering the transmitter to compensate for excess transmitter power according to one embodiment of the invention.

FIG. 24 is an operational flow diagram illustrating a process for decentering the transmitter to compensate for excess transmitter power according to one embodiment of the invention. In a step 1102, a receiver receives a signal from the transmitter.

The received transmit power is determined by a signal strength measurement, in a step 1104. The received signal strength can be used to determine whether the transmitter is operating at a power level such that, given current link operating conditions, the power level is too high or too low. For example, the signal strength determination can indicate that the receiver is saturated because the transmit power is too high. As such, it is desired that the transmit power level be turned down. Alternatively, the receiver may determine that the received power level is too low to allow an accurate detection of the transmitted data. This, for example, may occur where weather conditions have degraded substantially enough to impact the transmission of the signal from the transmitter to the receiver. As such, the receiver may wish to increase the effective transmit power.

It should be noted that, in one embodiment, the laser power and receiver dynamic range are selected such that with on-center pointing at nominal output power, the receiver can receive the transmitted signal in worst-case anticipated weather conditions. As such, as the weather begins to clear, the received signal strength will begin to rise toward the saturation point. Thus, in a step 1106, the receiver informs the remote transmitter that the power level is too high and needs to be turned down. In one embodiment, as stated above, the power level is effectively turned down by pointing the transmitter off center of the receiver. Thus, a portion of the transmit beam is outside the aperture of the receiver, resulting in the receiver receiving only a percentage of the actual transmitted power. As such, the signal can be adjusted to fall back down within the dynamic range of the receiver. The level of power attenuation is a function of the magnitude of pointing error introduced into the transmitter system.

In one embodiment, initial laser power settings can be determined from the initial retroreflector signals that were used to perform the coarse acquisition. Because the path should be symmetric, this determination can apply to both transceivers associated with the communication link 110.

The manner in which the information is communicated to the transmitter to decenter the pointing can be implemented according to a number of different embodiments. In embodiments where communication links 110 are implemented to transmit packetized data between nodes 108, an additional status packet can be inserted into the packet stream. This additional status packet can be used to provide this power level measurement indication as well as, perhaps, additional or alternative status or housekeeping information. Therefore, using this embodiment, the receiver can use in-band signaling to immediately notify the transmitter via communication link 110 that the transmitted power needs to be effectively adjusted. Alternatively, additional data can be including in the data field of existing packets to accomplish in-band signaling. In yet another alternative, in-band signaling can be used even where the communications across links 110 are not packetized.

Additionally, in alternative embodiments, the paging channel or other communication channel could be used to communicate this information back to the transmitter. However, this embodiment is not as preferable, as it requires an additional communication to take place between the receiver and the transmitter. It is preferred that additional bandwidth in the existing communication link 110 be utilized by adding this status packet to the transmission.

Receipt of the status information indicating that the power needs to be adjusted can be provided directly to the node head 654 such that the node head can adjust its azimuth or elevation gimbals accordingly. Alternatively, the signal is provided instead to node base 656 such that the controller within node base 656 can determine the amount of error to introduce and can drive the appropriate gimbals accordingly. These embodiments can be implemented using the multiplex data communication among node heads 654 and node base 656. They can also be implemented in systems using other communication schemes among node heads 654 and node base 656.

In one embodiment, the system can be implemented to wait until the receiver is in a saturated mode before requesting the transmitter to introduce a pointing error into the system. Alternatively, the system can be proactive and programmed to look ahead to predict whether the receiver is going to saturate and before actual saturation occurs. Thus, an upward trend in the power of the received signal may be extrapolated in advance to predict saturation and the transmitter adjusted accordingly. Alternatively, various threshold ranges can be set within the receiver dynamic range and the transmitter adjusted in increments depending on the range within which the power of the received signal falls.

For example, in the lowest threshold range of the dynamic range of the receiver, the transmitter is pointed to the highest degree of accuracy such that the peak of the galcian signal is centered on the spatial detector. When the power level of the received signal transitions to the next threshold range, the transmitter can be pointed off center a specified amount to reduce the effective received signal strength. This can continue where the amount of skewing of the transmitter is done based on the magnitude of the power of the received signal.

In an alternative embodiment, either the receiver or the transmitter or both can cause filters such as, for example, neutral density (ND) filters to be inserted into the transmission path. However, this embodiment utilizes additional materials as well as an additional mechanism to drive the filters in and out of the signal path. Furthermore, for varying degrees of attenuation, a plurality of filters may, in fact, be required. As such, this alternative embodiment requires additional hardware and therefore introduces additional cost and complexity into the system. On the other hand, the additional of a pointing error into the system can be done using the existing pointing mechanisms provided within node head 654. Therefore, this embodiment is preferred.

In yet another alternative, ND filters having varying degrees of attenuation controlled electronically can be used. However, this embodiment also utilizes additional materials to be added into the communication path.

In addition to this technique for decentering the laser, a signal from the receiver can be sent back to the transmitter to adjust the bias level of the transmitter, thereby reducing its transmit power. Again, this technique can use an in-band signaling technique where data or data packets can be inserted into the communication link between the receiver node 108 and the transmitter node 108, or another in-band signaling technique. Alternatively, another communication channel such as an auxiliary channel can be used.

Preferably, in the embodiment where look off is implemented, there is a technique for storing the centered pointing values such that the effective power can again be increased when needed, without the need to perform unnecessary searching or refinement algorithms.

As discussed above, in one embodiment, a spatial detector can be used to determine the pointing accuracy of a transmitter with respect to a receiver. Data from the spatial detector is used to provide feedback regarding the pointing, such that the pointing accuracy can be enhanced or otherwise improved. An alternative embodiment that avoids the use of a spatial detector can be implemented to determine pointing accuracy. Where the transmit beam exhibits spatial characteristics, it is possible to obtain information relating to these spatial characteristics, and to use this information to help determine the pointing accuracy. This information, in turn, can be used to improve the pointing accuracy of the system.

For example, a transmit beam having a gaussian profile ideally has a peak energy level at the center of the beam. This energy level falls off from the center point gradually at first, then more drastically, until a minimum signal level is approached. At some distance from the center, the signal level is so low that it is effectively undetectable. Because of these spatial characteristics, it is possible to determine the pointing accuracy based on the relative energy level of a received signal. Generally speaking, the transmit beam is slewed across the detector and the relative signal strength is measured during this process.

Simply stated, as the transmitter is slewed, the receiver indicates to the transmitter whether the signal strength is increasing or decreasing, and thus whether the transmitter is moving closer to center or farther off center. The receiver looks for the pointing angle that yields the highest signal strength. This angle is considered to be the angle associated with accurate pointing for the transmitter. In one embodiment, this is accomplished by the receiver providing signal strength information back to the transmitter using, for example an in-band communication technique such as that discussed above with reference to FIG. 24. Alternatively, this can be accomplished using other communication channels including, for example, an auxiliary channel.

Figure 25:
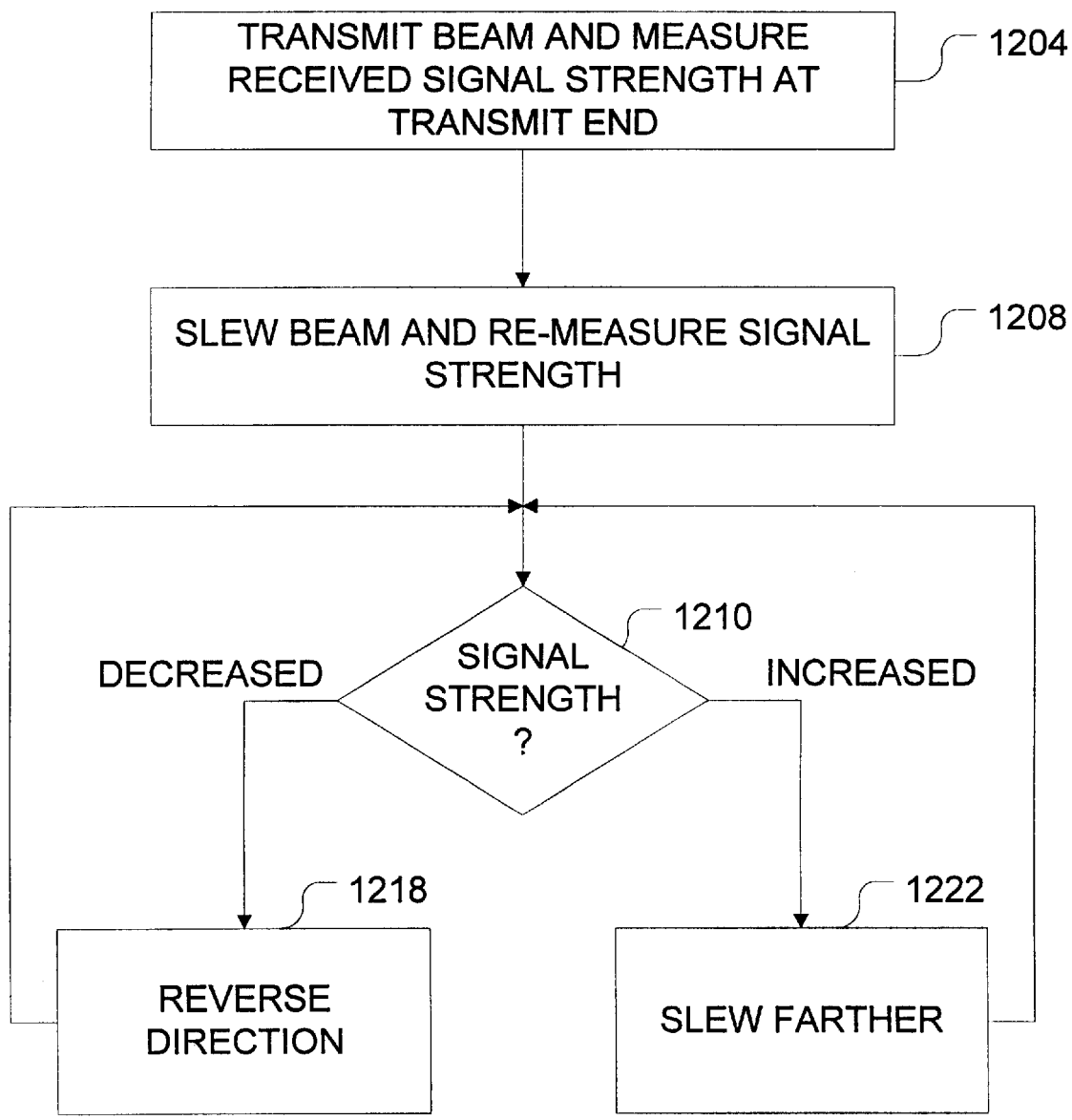
FIG. 25 is an operational flow diagram illustrating a process for utilizing a beam profile to determine pointing accuracy according to one embodiment of the invention.

FIG. 25 is an operational flow diagram illustrating a process for utilizing the beam profile to determine pointing accuracy according to one embodiment of the invention. Referring now to FIG. 25, in a step 1204, the beam is transmitted from the transmitter at a first node 108 to the designated receiver at a second node 108. In one embodiment, the transmit beam can be the communication beam used to establish a communication link 110 between the nodes 108. The designated receiver at the reception node 108 measures the received signal strength at the receiver.

In a step 1208, the transmitter is slewed such that the pointing of the transmit beam is changed. The receiver re-measures the signal strength such that it can be determined whether the slewing improve or degraded the pointing accuracy of the transmitter. In one embodiment, the slewing can be done in a stepwise fashion in measurements taken at the end of each step. In an alternative embodiment, the slewing can be continuous and measurements taken as the slewing occurs. Whether stepwise or continuous, the rate of slewing can be chosen based on the rate at which the signal strength can be measured, and the bandwidth of the feedback loop used to control the transmit beam. The operation is described for a stepwise embodiment. After reading this description, it will become apparent to one of ordinary skill in the art how to implement this process using a continuous-slew embodiment.

In a step 1210, it is determined whether the signal strength is lower or higher than the previous measurement. In other words, it is determined whether the signal strength has increased or decreased as a result of the slewing operation. In one embodiment, this determination is made at the receiver where the current receive signal strength is compared to the previously received signal strength to determine the relative change. In this embodiment, the receiver can provide a feedback signal to the transmitter indicating this change or delta in the received signal strength. In an alternative embodiment, the actual measurements can be relayed back to the transmitter, and the transmit node 108 can determine whether the current signal strength measurement is lower or higher than the previous signal strength measurement.

In one embodiment, in-band signaling is used to provide the information to the transmit node 108. Using in-band signaling, data indicating the received signal strength (actual or delta) is inserted into communication link 110 between the nodes. In one embodiment, additional packets are inserted into the communication channel 110 between the affected nodes 108, or additional data is inserted into existing packets transmitted between the nodes 108. Alternatively, an auxiliary channel or other communication path between nodes 108 can be used to relay this information.

If, in step 1210, it is determined that the received signal strength is higher, this is an indication that the transmitter is slewing in the correct direction to provide more accurate centering. As such, in a step 1222, the transmitter is slewed further. In a step 1210, the signal strength is re-measured to determine whether the signal strength has further increased, or instead decreased. If the signal strength has further increased, this loop between steps 1210 and 1222 continues until a degradation in the received signal strength is detected. As stated above, in one embodiment, this can be done in a step-wise fashion such that the transmitter is slewed by a fixed amount, a measurement taken, a determination made, and further step-wise slewing until a maximum is reached.

If, on the other hand, in a step 1210 it is determined that the new signal strength at the receiver is lower than the previous signal strength, this is an indication that the transmitter is being slewed in the wrong direction. Thus, in a step 1218, the transmitter is instructed to reverse the direction of the slew to slew back in the other direction. Where the previous command also instructed the transmitter to reverse the slew direction, this is an indication that the transmitter is roughly centered. As such, no further slewing needs to take place and the transmitter can be returned to its previous pointing angle.

In one embodiment, this procedure can be repeated for both the azimuth and the elevation axes such that the transmitter is centered to the degree of accuracy possible based on the step size of the gimbal positioning mechanisms. Because slewing of both the azimuth and elevation axes results in slewing in two roughly perpendicular directions, this is sufficient to center the beam to the degree of accuracy possible by the gimbal positioning system.

As with the spatial detector, this profile pointing technique can be performed at the initial integration of a node 108 within network 100, or to correct for pointing errors that may otherwise occur during the lifetime of a node 108. Such errors can occur, for example, as a result of expansion and contraction due to temperature changes, errors that may be introduced over time as a result of inaccuracies in the hardware mechanisms, changes in the relative position of one node with respect to another as a result of, for example, earthquakes, settling of a building or tower on which a node 108 is mounted, or other phenomenon that can result in the displacement of a node 108 relative to another node 108.

In one embodiment, the step size of the slewing controlled by the transmit gimbals can be, for example, 150 microradians ($\mu$rads). This is one-tenth of the divergence of the 1.5 mrad divergence beam. The amount of dwell time at each step depends on the tracking band width. In one embodiment, the transmitter can move as rapidly as five steps in one half of a second. Thus, in just a few seconds, according to this embodiment, the transmitter can be centered to within ±150 $\mu$rads.

As a result of this profile pointing mechanism, there is no longer a need to include a spatial detector at the receive end of a communication link 110. Thus, the hardware required to implement this spatial detector, along with its associated space constraints and costs, can be avoided.

Additionally, there is no need to include a beam splitter to extract a portion of the receive beam for pointing detection.

In certain scenarios, it is possible that the pointing accuracy initially obtained using an installation fixture such as that described above, or initially obtained through manual means, may not be accurate enough to allow initial acquisition of a node. This is because the pointing uncertainties are related to any positioning uncertainties divided by the range between nodes. Therefore, as the range decreases, the pointing uncertainty increases.

For example, in the example implementation described above where the receiver field of view is 3°, at distances greater than approximately 70 meters, the initial pointing determination may not bring the transmitter within the receiver field of view. As such, an alternative acquisition technique using retroreflectors can be employed as described below.

In one embodiment, one or more retroreflectors or corner cubes can be included at the node. Alternatively, reflector tape having properties similar to that of a series of retroreflectors or corner cubes can also be used. The concept of a retroreflector, as known to those in the optical arts, is to return or reflect a transmit beam back to its source. Retro reflectors typically have a relatively high acceptance angle (ten to twenty degrees, or more), and thus, will accept and return an optical beam in situations where the pointing accuracy would not be sufficient to illuminate a receiver having a 3° field of view. Once the retroreflector is acquired, the transmit beam can be centered on the retroreflector and then steered by an appropriate offset angle to designated receiver at one of the node heads 654 in the receive node 108.

Retroreflectors can be custom fabricated or obtained as off-the-shelf products. Retroreflectors are available in varying levels of quality, ranging from simple reflector-tape type of products to precisely fabricated retroreflectors of high optical quality.

Figure 26:
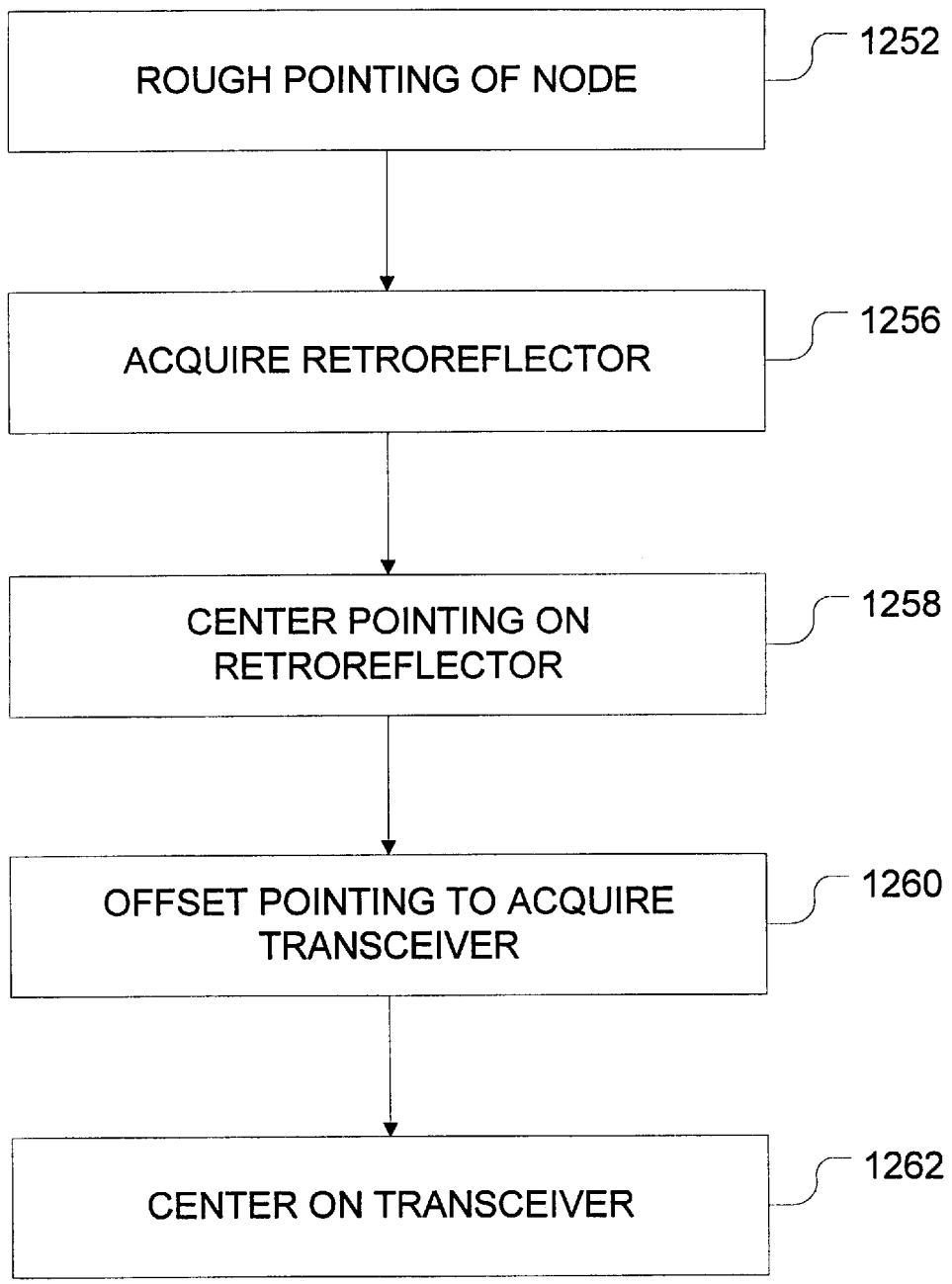
FIG. 26 is an operational flow diagram illustrating one process for using a retroreflector to acquire a node according to one embodiment of the invention.

FIG. 26 is an operational flow diagram illustrating one process for using a retroreflector to acquire a node 108 according to one embodiment of the invention. In a step 1252, some form of rough pointing is performed to approximately point the beam of the transmitter to the node 108 of the receiver. This rough pointing can be accomplished in many ways, including using the installation fixture in the embodiments described above, manual pointing, or other coarse pointing techniques. Binoculars, a scope, or other visual viewing aids can be mounted on the node or on an installation fixture to facilitate manual pointing. While these techniques may be sufficient to illuminate the receiver in certain geometries, there are other geometries where these relatively coarse techniques are not sufficient to initially acquire a node receiver.

In some embodiments, this coarse pointing may not even be sufficient to adequately acquire the retroreflector. Therefore, in a step 1256, the transmit beam is scanned to search for the retroreflector. Once the scanning beam locks onto its own signal from the retroreflector, in a step 1258, the transmitter centers on the acquired corner cube. In one embodiment, this can be accomplished similar to the profile technique described above where the transmit beam is scanned across the corner cube to look for the point where the maximum signal strength is returned to the receiver at the transmitter location.

The transmitter now begins a scan in another direction to actually illuminate the receiver for the designated transceiver of the node 108. This is illustrated by a step 1260. In one embodiment, this scan is at worst a 10 by 10 degree uncertainty field, and can be performed in well under one minute. Once the detector is acquired, the transmit beam can be centered on the detector in a step 1264. The centering techniques can include the spatial detector technique and the beam profile technique described above. Thus, according to this technique, a corner cube or other like reflector can be used to perform a coarse acquisition, and once the corner cube is acquired, the beam can be directed to the receiver and the fine tuning can take place. In one embodiment, the degree of accuracy obtained using the installation fixture is sufficient to illuminate the retro reflector even where it is not sufficient to illuminate the receiver. Thus, in this embodiment, manual or coarse pointing is not needed.

In one embodiment, the retro reflectors can be mounted on the node, on an installation fixture, or at some other location where the pointing difference between this location and the actual receiver are known. As such, once the retro reflector is acquired, the beam can be steered to the receiver.

Because the offset between a retro reflector and the receiver will require a different transmitter angle offset at different ranges, it is preferable that the range between the nodes 108 is known such that the correct transmitter angle offset can be determined. In one embodiment, the motor drive system is capable of one-tenth the transmitter beam width resolution such that it can accurately point the transmit beam at the receiver. Again, once the receiver has picked up the signal, a communication link can be established between the two nodes via a transport channel 110. As such, the optimization of the pointing angles can then begin.

While various embodiments of the present invention have been shown and described above, it should be understood that they have been presented by way of example only, and not limitation. It should be apparent to those of ordinary skill in the art that many other embodiments are possible without departing from the spirit and scope of the invention. Thus, the breadth and scope of the present invention should not be limited by any of the above-described exemplary embodiments, but should be defined only in accordance with the claims and their equivalents.

What is claimed is:

1. A method for transmitting data on a communication link between a first transceiver and a second transceiver in a free space optical communication network, the method comprising:

transmitting on the communication link a plurality of data packets from the first transceiver;

transmitting from the first transceiver via in-band signaling a status packet comprising data indicative of an azimuth angle of the second transceiver;

receiving the plurality of data packet at the second transceiver;

retrieving the status packet from the plurality of data packets;

adjusting a characteristic of at least one transceiver based on the retrieved status packet.

2. The method of claim 1, wherein the status packet is sent on the communication link between two data packets of the plurality of data packets.

3. The method of claim 1, wherein the status packet is inserted into at least one of said plurality of data packets.

4. The method of claim 1, wherein the status packet is sent on the communication link using bandwidth of the communication link.

5. The method of claim 1, wherein the status packet comprises data indicative of a signal strength of a communication signal transmitted from the second transceiver to the first transceiver.

6. The method of claim 1, wherein the status packet comprises a signal strength of a communication signal transmitted from the second transceiver to the first transceiver.

7. The method of claim 1, wherein the status packet comprises data indicative of an alignment of the first and second transceivers.

8. The method of claim 1, wherein the status packet comprises data indicative of an elevation angle of the second transceiver.

9. The method of claim 1, wherein the status packet comprises data indicative of a power level of the second transceiver.

10. The method of claim 1, wherein the status packet comprises data based on a communication signal transmitted from the second transceiver to the first transceiver.

11. The method of claim 10, wherein the status packet comprises data indicative of a signal strength of the communication signal measured at the first transceiver.

12. A method for automatically aligning optical transceivers in a free space optical communication network including a first transceiver and a second transceiver aligned generally towards one another, the method comprising:

determining at the second transceiver a characteristic of an optical communication signal received from the first transceiver;

transmitting from the second transceiver via in-band signaling a second optical communication signal including the characteristic of the optical communication signal and user data; and adjusting one of an azimuth angle, an elevation angle, and a power level of the first transceiver based on the characteristic of the optical communication signal received from the second transceiver.

13. The method of claim 12, wherein said in-band signaling uses bandwidth in an optical communication link between said first and second transceivers.

14. The method of claim 12, wherein the user data comprises a plurality of data packets and in-band signaling inserts the status packet into at least one of the plurality of data packets.

15. The method of claim 12, wherein the characteristic of the optical communication signal is indicative of a signal strength of the optical communication signal.

16. The method of claim 12, wherein the characteristic of the optical communication signal is a signal strength of the optical communication signal.

17. The method of claim 12, further comprising:
determining at the first transceiver a characteristic of a third optical communication signal received from the second transceiver;
transmitting from the first transceiver via in-band signaling a fourth optical communication signal including the characteristic of the third optical communication signal and user data; and
adjusting a characteristic of the second transceiver based on the characteristic of the third optical communication signal received from the first transceiver.

18. A method for automatically tracking the movements of optical transceivers in a free space optical communication network including a first transceiver and a second transceiver aligned generally towards one another, the method comprising:
transmitting from the first transceiver an optical communication signal;
receiving at the second transceiver the optical communication signal;
measuring at the second transceiver a signal strength of the optical communication signal;
transmitting from the second transceiver, via in-band signaling, a second optical communication signal comprising a status packet and user data, wherein the status packet includes an indication of the signal strength; and
adjusting an alignment of the first transceiver based on the status packet received from the second transceiver, wherein the act of adjusting an alignment comprises adjusting one of an elevation angle and an azimuth angle of the first transceiver.

19. The method of claim 18, wherein the status packet is inserted into said user data.

20. The method of claim 18, wherein the step of adjusting further comprises:
moving the first transceiver in a first direction;
re-measuring at the second transceiver the signal strength of the received optical communication signal;
transmitting from the second transceiver, via in-band signaling, an updated second optical communication signal including the re-measured signal strength;
moving the first optical transceiver in the first direction if the re-measured signal strength is determined to be higher than the measured signal strength; and
moving the first optical transceiver in a second direction if the re-measured signal strength is determined to be lower than the measured signal strength.

21. The method of claim 20, wherein the act of moving the first optical transceiver in the first direction comprises adjusting an elevation angle of the first optical transceiver.

22. The method of claim 21, wherein the act of moving the first optical transceiver in the second direction comprises adjusting an elevation angle of the first optical transceiver, wherein the second direction is opposite the first direction.

23. The method of claim 20, wherein the act of moving the first optical transceiver in the first direction comprises adjusting an azimuth angle of the first optical transceiver.

24. The method of claim 21, wherein the act of moving the first optical transceiver in the second direction comprises adjusting an azimuth angle of the first optical transceiver, wherein the second direction is opposite the first direction.

25. The method of claim 20, further comprising:
repeating the acts of re-measuring, transmitting, determining, and moving the first optical transceiver.

26. A free space optical communication system comprising:
a first transceiver;
a second transceiver;
means for transmitting from the first transceiver an optical communication signal;
means for receiving at the second transceiver the optical communication signal;
means for measuring at the second transceiver a signal strength of the optical communication signal;
means for transmitting from the second transceiver, via in-band signaling, a second optical communication signal comprising a status packet and user data, wherein the status packet includes an indication of the signal strength; and
means for adjusting an alignment of the first transceiver based on the status packet received from the second transceiver, wherein the act of adjusting an alignment comprises adjusting one of an elevation angle and an azimuth angle of the first transceiver.

* * * * *